(12) United States Patent
Garapati et al.

(10) Patent No.: US 7,945,751 B2
(45) Date of Patent: May 17, 2011

(54) DISK IMAGE INHERITANCE

(75) Inventors: Rekha Devi Garapati, Saratoga, CA (US); Zhe Xiang, Beijing (CN); Velnambi Yogalingam, San Jose, CA (US); Kai Gee Hoong Young, Santa Clara, CA (US)

(73) Assignee: International Business Machines Corporation, Armonk, NY (US)

( * ) Notice: Subject to any disclaimer, the term of this patent is extended or adjusted under 35 U.S.C. 154(b) by 525 days.

(21) Appl. No.: 11/612,318

(22) Filed: Dec. 18, 2006

(65) Prior Publication Data

US 2008/0144471 A1 Jun. 19, 2008

(51) Int. Cl.
 *G06F 12/00* (2006.01)
(52) U.S. Cl. .................. 711/162; 711/114; 711/154
(58) Field of Classification Search .................. 711/114, 711/162
See application file for complete search history.

(56) References Cited

U.S. PATENT DOCUMENTS

| | | | |
|---|---|---|---|
| 6,772,192 B1 * | 8/2004 | Fulton et al. .................. 709/203 |
| 2001/0056524 A1 | 12/2001 | Ono | |
| 2003/0126242 A1 * | 7/2003 | Chang .......................... 709/222 |
| 2003/0158869 A1 | 8/2003 | Micka | |
| 2003/0182325 A1 | 9/2003 | Manley et al. | |
| 2004/0078641 A1 | 4/2004 | Fleischmann | |
| 2004/0153710 A1 | 8/2004 | Fair | |
| 2004/0163008 A1 * | 8/2004 | Kim .................................. 714/4 |
| 2004/0221125 A1 | 11/2004 | Ananthanarayanan et al. | |
| 2004/0243775 A1 | 12/2004 | Coulter et al. | |
| 2005/0071372 A1 | 3/2005 | Bartfai et al. | |
| 2005/0188251 A1 | 8/2005 | Benhase et al. | |
| 2005/0210320 A1 | 9/2005 | Vincent | |

FOREIGN PATENT DOCUMENTS

| | | | |
|---|---|---|---|
| EP | 1643365 A2 | 5/2006 |
| WO | 03069477 A2 | 8/2003 |

OTHER PUBLICATIONS

Notification of Transmittal of the International Search Report and the Written Opinion of the International Searching Authority, International Application No. PCT/EP2007/062932, Applicant's file reference SVL060064, Date of Mailing of the International Search Report: Feb. 27, 2008. <1 page>.

(Continued)

*Primary Examiner* — Mardochee Chery
(74) *Attorney, Agent, or Firm* — Janet M. Skafar; Farrokh E. Pourmirzaie

(57) ABSTRACT

A disk image is generated, stored in at least one persistent storage device, comprises at least one software application, and is a root disk image. An inheritance tree comprising a root node associated with the root disk image is created. A new disk image of a disk is generated based on a previously generated disk image associated with a node of the inheritance tree. The new disk image is stored in at least one persistent storage device, and comprises at least one software application of the previously generated disk image and at least one new software application. The new disk image shares at least one data block of the previously generated disk image. A new node is added to the inheritance tree, and is associated with the new disk image. The new node is a child node of the node that is associated with the previously generated disk image.

27 Claims, 9 Drawing Sheets

OTHER PUBLICATIONS

International Search Report, International Application No. PCT/EP2007/062932, Applicant's file reference SVL060064, Date of Mailing of the International Search Report: Feb. 27, 2008. <4 pages>.

Written Opinion of the International Searching Authority, International Application No. PCT/EP2007/062932, Applicant's file reference SVL060064, Date of Mailing of the Written Opinion of the International Searching Authority: Feb. 27, 2008. <6 pages>.

Introduction to IBM TotalStorage DS4000 Storage Manager Copy Services (formerly IBM TotalStorage FAStT Storage Manager), IBM Systems and Technology Group [online] Aug. 2004 [retrieved on Nov. 26, 2006] Retrieved from the Internet: <URL: http://www-03.ibm.com/servers/storage/disk/ds4000/pdf/white-paper.pdf>. 16 pages.

Backup and Recovery of RDM 4.20, A White Paper [online] Jan. 25, 2005 [retrieved on Oct. 23, 2006] Retrieved from the Internet: <URL: ftp://ftp.software.ibm.com/pc/pccbbs/pc_servers_pdf/rdmbackuprecovery.pdf>. 21 pages.

Using RDM to Deploy Applications and Windows, A White Paper, [online] Oct. 11, 2005 [retrieved on Aug. 19, 2006] Retrieved from the Internet: <URL: ftp://ftp.software.ibm.com/pc/pccbbs/pc_servers_pdf/installingapplicationswithwindows.pdf>. 74 pages.

Planning for configuring the SAN Volume Controller [online] Copyright IBM Corporation, 2003, 2006 [retrieved on Oct. 16, 2006]. Retrieved from the Internet: <URL: http://publib.boulder.ibm.com/infocenter/svcic/v3r1m0/topic/com.ibm.svs.web.doc/svc_svcplanconfiguration21gf04.html>. 2 pages.

SVC virtual disks [online] Copyright IBM Corporation 2003, 2004. [retrieved on Dec. 1, 2006] Retrieved from the Internet: <URL: http://publib.boulder.ibm.com/infocenter/tivihelp/v4r1/topic/com.ibm.storage.mdm.console.doc_2.1/svc_vdiskovr_1bchem.html>3 pages.

Creating virtual disks [online] Copyright IBM Corporation 2003, 2004 [retrieved on Dec. 1, 2006] Retrieved from the Internet:<URL: http://publib.boulder.ibm.com/infocenter/tivihelp/v4r1/topic/com.ibm.storage.mdm.console.doc._2.1/mdm_createvdisks_1chdim.html>. 2 pages.

Volumes [online] Copyright IBM Corporation 2003, 2004 [retrieved on Dec. 1, 2006] Retrieved from the Internet: <URL: http://publib.boulder.ibm.com/infocenter/tivihelp/v4r1/topic/com.ibm.storage.mdm.console.doc_2.1/mdm_volumes_1c4ak1.html>. 1 page.

Creating volumes or MDisks [online] Copyright IBM Corporation 2003, 2004. [retrieved on Dec. 1, 2006] Retrieved from the Internet: <URL: http://publib.boulder.ibm.com/infocenter/tivihelp/v4r1/topic/com.ibm.storage.mdm.console.doc_2.1/mdm_creatingvolumes_1c4akm.html>. 2 pages.

SVC managed disks [online] Copyright IBM Corporation 2003, 2004. [retrieved on Dec. 1, 2006] Retrieved from the Internet: <URL: http://publib.boulder.ibm.com/infocenter/tivihelp/v4r1/topic/com.ibm.storage.mdm.console.doc_2.1/svc.mdisksovr_1bchav.html>. 3 pages.

FlashCopy images [online] Copyright IBM Corporation 2003, 2004 [retrieved on Oct. 16, 2006] Retrieved from the Internet: <URL: http://publib.boulder.ibm.com/infocenter/tssfsv21/topic/com.ibm.sanfs.doc/foe0_c_point_in_time_copies.html>. 1 page.

Glossary of terms used by VMware [online] 2005 VMware, Inc. [retrieved on Oct. 22, 2006] Retrieved from the Internet: <URL: http://www.vmware.com/support/reference/common/glossary/>. 3 pages.

Ways to Copy the Contents of One Hard Disk Drive to Another [online] Last updated Dec. 11, 2002 [retrieved on Oct. 23, 2006] Retrieved from the Internet: <URL: http://www.duxcw.com/digest/Howto/hd/cpyhd/index.html>. 3 pages.

Edward Mendelson, Norton Ghost 9.0 review by PC Magazine [online] review date: Sep. 9, 2004 [retrieved on Oct. 23, 2006] Retrieved from the Internet: <URL: http://www.pcmag.com/article2/0,1759,1644438,00.asp>. 5 pages.

Jeff Bertolucci, Norton Ghost 9.0 Reviews. Backup and recovery Reviews by CNET [online] Reviewed on Feb. 2, 2005 [retrieved on Oct. 23, 2006] Retrieved from the Internet: <URL: http://reviews.cnet.com/Norton_Ghost_9_0/4505-3682_7-31000570.html>. 5 pages.

Hitachi Introduces Revolutionary Mindrange Storage Virtualization Engine [online] Jul. 11, 2005 [retrieved on Oct. 24, 2006] Retrieved from the Internet: <URL: http://www.hds.com/press_room/press_releases/g1050711b.html>. 3 pages.

Hitachi TagmaStore Universal Storage Platform, Hitachi TagmaStore Network Storage Controller [online] Sep. 2005 [retrieved on Oct. 24, 2006] Retrieved from the Internet: <URL: http://www.vion.com/Documents/Tagmastore_USP_NSC_501_00.pdf>. 16 pages.

* cited by examiner

Inheritance Trees
44

DISK IMAGE INHERITANCE

BACKGROUND OF THE INVENTION 1.0 Field of the Invention

This invention relates to application server provisioning; and in particular, this invention relates to application server provisioning by disk image inheritance.

2.0 Description of the Related Art

In the current service-oriented Information Technology (IT) business market, fast and on-demand application server provisioning is a significant requirement for a data center. An "application server" is a computer that executes at least one software application in order to serve at least one client computer. A typical data center may host one or more customers; and each customer is typically provided with at least one application server. The software that is executed by an application server is referred to as application server software. The application server may have its own local disk, or may use a disk in a storage area network. The disk contains the software that is to be executed by the application server.

Various tools are used to create a full disk image to backup a disk in a computer system, and this backup image can be used to restore the disk in the event of a failure. To provision software for a new application server using one well-known method, a service provider copies a single full backup image of a disk that contains all the desired software applications to a disk from which the software will be executed by the application server. Using this method, an application server can typically be provisioned in a few minutes.

Application server software can have many options. Different customers typically use different application servers having, for example, different types of server machines and different software applications including operating systems. Using one technique, in order to provision application server software in a timely manner, the provisioning service provider prepares and maintains full disk images comprising many, or all, the application server software options. This results in a large number of full disk images which need to be stored. Each full disk image of the application server software contains all the software applications, typically including the operating system, of that application server software. Storing those full disk images consumes a large amount of storage. For example, assume that a data center has four different server machine types, three different operating systems, two versions of a database server, such as, the IBM® (Registered trademark of International Business Machines Corporation) DB2® (Registered trademark of International Business Machines Corporation) server, and two versions of an IBM WebSphere® (Registered trademark of International Business Machines Corporation) Application Server (WAS 6 and WAS 5). In addition, the DB2 server and WAS can be installed in same application server or in separate application servers. Therefore, in this example, there are a total of ninety-six (4×3×(2+2+2×2)=96) different possible options of application server software. To provide all possible different options, the service provider stores ninety-six full disk images of the application server software. Considering that the typical disk size of an application server is very large, for example, twenty gigabytes (20 G), storing ninety-six different full disk images of twenty gigabyte disks will consume 1.92 terabytes (96×20 G=1920 G) of storage space. In practice, a data center may have even more installation options and therefore an even larger storage requirement, which makes disk image-based application server software provisioning difficult to implement.

Therefore, there is a need for an improved technique for provisioning application server software.

SUMMARY OF THE INVENTION

To overcome the limitations in the prior art described above, and to overcome other limitations that will become apparent upon reading and understanding the present specification, various embodiments of a method, computer program product, and storage system that can be used to provision a server are provided. In some embodiments, a disk image is generated. The disk image is stored in at least one persistent storage device. The disk image comprises at least one software application. The disk image is a root disk image. An inheritance tree comprising a root node associated with the root disk image is created. A new disk image of a disk is generated based on a previously generated disk image associated with a node of the inheritance tree. The new disk image is stored in at least one persistent storage device. The new disk image comprises at least one software application of the previously generated disk image and at least one new software application. The new disk image shares at least one data block of the previously generated disk image in at least one persistent storage device. At least one data block of the new disk image is different from the previously generated disk image. A new node is added to the inheritance tree. The new node is associated with the new disk image. The new node is a child node of the node that is associated with the previously generated disk image.

In some embodiments, in response to a user, the generating of the new disk image and adding the new node are repeated.

In another embodiment, the previously generated disk image comprises a plurality of software applications, and the new disk image comprises all of the plurality of the software applications of the previously generated disk image and at least one new software application.

In yet another embodiment, the disk is a virtual disk.

In another embodiment, the at least one persistent storage device comprises at least one managed disk.

In other embodiments, the generating of the disk image comprises performing a flash copy, and the generating of the new disk image comprises performing an incremental flash copy.

In some embodiments, the inheritance tree is graphically presented.

In various embodiments, the inheritance tree comprises a plurality of nodes associated with a plurality of disk images, respectively. One of the nodes of the inheritance tree is selected; and the disk image associated with the one of the nodes that is selected is mapped to a host.

In another embodiment, the inheritance tree comprises a plurality of nodes associated with a plurality of disk images, respectively. One node of the plurality of nodes of the inheritance tree is selected. The disk image associated with the one node that is selected is copied from the at least one persistent storage device to the disk. At least one new software application is installed on the disk.

In yet another embodiment, the inheritance tree comprises a plurality of nodes associated with a plurality of disk images, respectively. A request to provision application server software is received. The request specifies at least one software application. One node of the nodes of the inheritance tree is identified based on at least one software application of the request. The disk image corresponding to the one node that is identified is copied to a virtual disk. The virtual disk is mapped to the host.

In some embodiments, each node of the plurality of nodes comprises a disk image name, a timestamp, and an application stack name, and the identifying of the one node of the plurality of nodes of the inheritance tree is also based on the application stack name; and the disk image that is copied is based on the disk image name and the timestamp corresponding to the one node that is identified.

In various embodiments, the inheritance tree comprises a plurality of nodes associated with a plurality of disk images, respectively. A request to provision an application server is received. The request specifies at least one software application. One node of the plurality of nodes of the inheritance tree is identified based on at least one software application of the request. The disk image corresponding to the one node that is identified is mapped to a host.

In various embodiments, a computer program product comprises a computer usable medium having computer usable program code for provisioning a server. The computer program product includes computer usable program code for generating a disk image, the disk image being stored in at least one persistent storage device. The disk image comprises at least one software application, the disk image being a root disk image. Also included is computer usable program code for creating an inheritance tree comprising a root node that is associated with the root disk image. Also included is computer usable program code for generating a new disk image of a disk based on a previously generated disk image associated with a node of the inheritance tree, the new disk image being stored in the at least one persistent storage device. The new disk image comprises at least one software application of the previously generated disk image and at least one new software application. The new disk image shares at least one data block of the previously generated disk image in at least one persistent storage device. At least one data block of the new disk image is different from the previously generated disk image. Also included is computer usable program code for adding a new node to the inheritance tree. The new node is associated with the new disk image. The new node is a child node of the node associated with the previously generated disk image.

In some embodiments, the computer usable program code for generating the disk image invokes a flash copy, and the computer usable program code for generating the new disk image invokes an incremental flash copy.

In another embodiment, the computer program product further comprises computer usable program code for presenting the inheritance tree.

In yet another embodiment, the computer program product further comprises computer usable program code for receiving a selection of a node of the inheritance tree; and computer usable program code for mapping the disk image associated with the node that is selected to a host.

In various embodiments, the inheritance tree comprises a plurality of nodes associated with a plurality of disk images, respectively. In these various embodiments, the computer program product further comprises: computer usable program code for receiving a request to provision server software, the request specifying at least one software application and a host; computer usable program code for identifying one node of the plurality of nodes of the inheritance tree; computer usable program code for copying the disk image associated with the one node that is identified from the at least one persistent storage device to a virtual disk; and computer usable program code for mapping the virtual disk to the host.

In other embodiments, the request specifies a plurality of software applications. The computer program product further comprises: computer usable program code for identifying one similar node of the nodes of the inheritance tree associated with a similar disk image comprising less than all of the software applications of the request; and computer usable program code for copying the similar disk image to a virtual disk.

In yet other embodiments, each node of the plurality of nodes comprises a disk image name, a timestamp, and an application stack name, and the computer usable program code for identifying the one node of the plurality of nodes of the inheritance tree is based on the application stack name; and the computer usable program code for copying the disk image copies the disk image based on the disk image name and the timestamp corresponding to the one node that is identified.

In some embodiments, the inheritance tree comprises a plurality of nodes associated with a plurality of disk images, respectively, and the computer program product further comprises: computer usable program code for receiving a request to provision server software, the request specifying at least one software application and a host; computer usable program code for identifying one node of the plurality of nodes of the inheritance tree based on the at least one software application of the request; and computer usable program code for mapping the disk image corresponding to the one node that is identified to the host.

In various embodiments, a storage system comprises at least one processor, at least one persistent storage device and a memory. The persistent storage device(s) store a plurality of disk images sharing at least one data block. The memory stores an inheritance tree comprising a plurality of nodes, each node being associated with a disk image of the plurality of disk images. The plurality of nodes has a hierarchical relationship based on at least one software application associated with the plurality of disk images. The memory also stores instructions to be executed by the at least one processor. The instructions cause the at least one processor to generate a root disk image, the root disk image being stored in at least one persistent storage device, the root disk image comprising at least one software application. The instructions also cause the at least one processor to create a new inheritance tree comprising a root node that is associated with the root disk image. The instructions also cause the at least one processor to generate a new disk image of a disk based on one disk image of the plurality of disk images. The new disk image is stored in at least one persistent storage device. The new disk image comprises at least one software application of the one disk image and at least one new software application. The new disk image shares at least one data block of the one disk image in the at least one persistent storage device. At least one data block of the new disk image is different from the one disk image. The instructions also cause the processor to add a new node to the inheritance tree, the new node being associated with the new disk image, the new node being a child node of the node associated with the one disk image.

In some embodiments, the instructions that cause the at least one processor to generate the disk image invoke a flash copy, and the instructions that cause the at least one processor to generate the new disk image invoke an incremental flash copy.

In other embodiments, the memory further comprises instructions causing the at least one processor to present the inheritance tree.

In yet other embodiments, the memory further comprises instructions causing the at least one processor to receive a selection of a node of the inheritance tree, and map the disk image associated with the node that is selected to a server.

In various embodiments, the memory further comprises instructions causing the at least one processor to: select one node of the plurality of nodes of the inheritance tree; copy the disk image associated with the one node that is selected from the at least one persistent storage device to the disk; and install at least one new software application on the disk.

In other embodiments, the memory further comprises instructions causing the at least one processor to: receive a request to provision server software, the request specifying at least one software application; select one node of the nodes of the inheritance tree based on at least one software application of the request; copy the disk image corresponding to the one node that is identified to a virtual disk; and map the virtual disk to a host.

In yet other embodiments, each node comprises a disk image name, a timestamp, and an application stack name, and the one node of the plurality of nodes of the inheritance tree is selected based on the application stack name; and the disk image that is copied is selected based on the disk image name and the timestamp corresponding to the one node.

In some embodiments, the memory further comprises instructions causing the at least one processor to: receive a request to provision a server, the request specifying at least one software application and a host; identify one node of the plurality of nodes based on the at least one software application of the request; and map the disk image corresponding to the one node to the host.

In various embodiments, a computer-implemented method of provisioning a server using a storage system comprises generating, in the storage system, a disk image. The disk image comprises a plurality of data blocks. All of the plurality of data blocks of the disk image are stored in at least one persistent storage device. The disk image comprises at least one software application. The disk image is a root disk image. The disk image has a disk image name and a timestamp. The storage system receives an application stack name of the root disk image. In the storage system, an inheritance tree comprising a root node that is associated with the root disk image is created. The root node comprises the disk image name, the timestamp and the application stack name of the root disk image. In the storage system, a new disk image of a disk is generated based on a previously generated disk image associated with a node of the inheritance tree. The new disk image is stored in the at least one persistent storage device. The new disk image comprises each software application of the at least one software application of the previously generated disk image and at least one new software application. The new disk image shares at least one data block of the previously generated disk image in the at least one persistent storage device. At least one data block of the new disk image is different from the previously generated disk image. The new disk image has a new disk image name and a new timestamp. The storage system receives a new application stack name of the new disk image. The storage system adds a new node to the inheritance tree. The new node comprises the new disk image name, the new timestamp and the new application stack name. The new node is a child node of the node associated with the previously generated disk image.

In some embodiments, the storage system, in response to a user, repeats the generating of a new disk image, the receiving of the new application stack name, and the adding of the new node to the inheritance tree.

In other embodiments, the disk is a virtual disk and the at least one persistent storage device comprises at least one managed disk.

In yet other embodiments, the generating of the disk image comprises performing a flash copy, and the generating of a new disk image comprises performing an incremental flash copy.

In some embodiments, one node of the nodes of the inheritance tree is selected; and an application server is mapped to the disk image corresponding to the one node that is selected.

In various embodiments, a storage system comprises at least one processor, at least one persistent storage device and a memory. The persistent storage device(s) store a plurality of disk images sharing at least one data block. The memory stores an inheritance tree comprising a plurality of nodes, each node being associated with a disk image. A first node of the plurality of nodes is a root node. The plurality of nodes has a hierarchical relationship. The memory also stores instructions to be executed by the at least one processor, the instructions causing the at least one processor to generate a root disk image by performing a flash copy, the root disk image being stored in the at least one persistent storage device, the root disk image comprising at least one software application. The instructions cause the at least one processor to create an inheritance tree comprising a root node that is associated with the root disk image. The instructions cause the at least one processor to generate, by performing an incremental flash copy, a new disk image of a disk based on a one disk image of the plurality of disk images. The new disk image is stored in the at least one persistent storage device. The new disk image comprises at least one software application of the one disk image and at least one new software application. The new disk image shares at least one data block of the one disk image in the at least one persistent storage device. At least one data block of the new disk image is different from the one disk image. The instructions cause the at least one processor to add a new node to the inheritance tree, the new node being associated with the new disk image, the new node being a child node of the node associated with the one disk image.

In some embodiments, in the storage system the memory further comprises one or more instructions that cause the at least one processor to receive a request to provision an application server, the request specifying at least one software application and the application server; identify a particular node of the nodes of the inheritance tree based on the at least one software application of the request; copy a disk image associated with the particular node to a virtual disk; and map the virtual disk to the application server. In various embodiments, the virtual disk has the well-configured operating system, middleware and other desired application software. After mapping the virtual disk to the application server, the application server is ready to run to provide service.

In this way, various embodiments of an improved technique for provisioning software are provided.

BRIEF DESCRIPTION OF THE DRAWINGS

The teachings of the present invention can be readily understood by considering the following description in conjunction with the accompanying drawings, in which.

To facilitate understanding, identical reference numerals have been used, where possible, to designate identical elements that are common to some of the figures.

DETAILED DESCRIPTION

After considering the following description, those skilled in the art will clearly realize that the teachings of the various embodiments of the present invention can be utilized to provision software. Various embodiments of a computer-implemented method, computer program product and storage system are provided. A disk image is generated. The disk image is stored in at least one persistent storage device. The disk image comprises at least one software application. The disk image is a root disk image. An inheritance tree comprising a root node associated with the root disk image is created. A new disk image of a disk is generated based on a previously generated disk image associated with a node of the inheritance tree. The new disk image is stored in at least one persistent storage device. The new disk image comprises at least one software application of the previously generated disk image and at least one new software application. The new disk image shares at least one data block of the previously generated disk image in at least one persistent storage device. At least one data block of the new disk image is different from the previously generated disk image. A new node is added to the inheritance tree. The new node is associated with the new disk image. The new node is a child node of the node that is associated with the previously generated disk image.

In some embodiments, in response to a user, the generating of the new disk image and adding the new node are repeated.

Using various embodiments of the present invention, a large number of disk images of server software can be efficiently stored in a storage system, and server software can be provisioned quickly.

Figure 1:
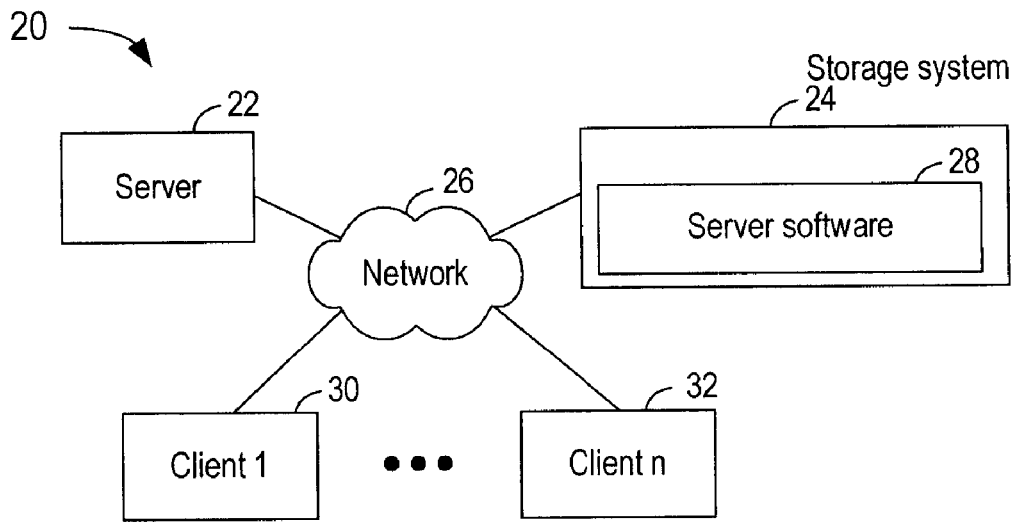
FIG. 1 depicts a diagram of an illustrative data processing environment using various embodiments of the present invention.

FIG. 1 depicts a diagram of an illustrative data processing environment 20 using various embodiments of the present invention. A server 22 communicates with a storage system 24 through a network 26. In some embodiments, the server 22 is implemented using a single computer system; in other embodiments, the server is implemented using a blade server. In various embodiments, the server 22 is an application server, and in some embodiments, a web application server. In other embodiments, the server 22 is not an application server. In yet other embodiments, the server 22 has an operating system and accesses the storage system 24 for other software applications.

In various embodiments, the storage system 24 is a storage area network. The storage system 24 stores server software 28 which is executed by the server 22. The server software 28 comprises at least one software application, and typically comprises an operating system. In embodiments in which the server 22 is an application server, the server software 28 is application server software. In this description, the phrase "software application" is intended to encompass an operating system in addition to software applications such as database management systems, utilities, tools, and other non-operating system software.

Client systems, client one (1) 30 to client n 32 communicate with the server 22 through the network 26. The client systems 30, 32 are typically computer systems. The client system 30, 32, communicates with the server 22. For example, a web browser is executing on client system 30 and is displaying a web page. In response to activating a button, or other control, on the web page on client system 30, the web browser 30 sends a request for information to the server 22 through the network 26. The server 22, which is executing the server software 28, processes the request and returns the requested information to the client system 30 via the network 26.

The storage system 24 has at least one storage device. In various embodiments, the storage device(s) of the storage system 24 comprise at least one physical storage device such as a disk.

In general, a volume is a labeled logical unit, which can be a physical device or a logical device. In various embodiments, volumes in a storage area network are also called managed disks.

A managed disk is a logical disk, typically a redundant array of independent disks or partition thereof, that is exported by a storage subsystem to a storage area network. In some embodiments, the storage subsystem is part of the storage area network. In other embodiments, the storage subsystem is external to the storage area network. In some embodiments, a managed disk comprises one or more physical disks that are presented as a single logical disk. The managed disk provides usable blocks of physical storage and may not have a one-to-one correspondence with a physical disk. Each managed disk is divided into a number of storage blocks. In some embodiments, a storage block is an extent. The extent size is a property of managed disk groups.

In various embodiments, the storage system 24 comprises at least one virtual storage device, such as a virtual disk. In various embodiments, the virtual disk is an abstraction layer which consolidates a physical storage subsystem into a single reservoir. A virtual disk is a logical disk that is presented to a server. Using a storage area network, a server, such as an application server, accesses the virtual disk. The server 22 accesses data on the virtual disk by requesting at least one specific data block of the virtual disk. In response to a request for at least one specific data block, the storage system 24 provides the requested data block(s) to the server 22. For example, the server 22 retrieves a software application, or portion thereof, on the virtual disk for execution by requesting one or more specific data blocks of the virtual disk. The data blocks of a virtual disk are stored in storage blocks of a managed disk. In some embodiments, a virtual disk comprises a set of one or more extents of at least one managed disk. Therefore the virtual disk is stored on one or more physical disks.

Generally, a disk image is a set of data containing the complete content and structure of a data storage device. The data storage device may be a virtual disk or a physical disk. In various embodiments, the disk image is stored into a virtual disk, and in other embodiments the disk image is stored directly into a physical storage device. In various embodiments, the disk images are stored and managed using storage blocks and data blocks, and the storage system does not need to understand file system concepts. In some embodiments, the disk images are managed using volumes.

Figure 2:
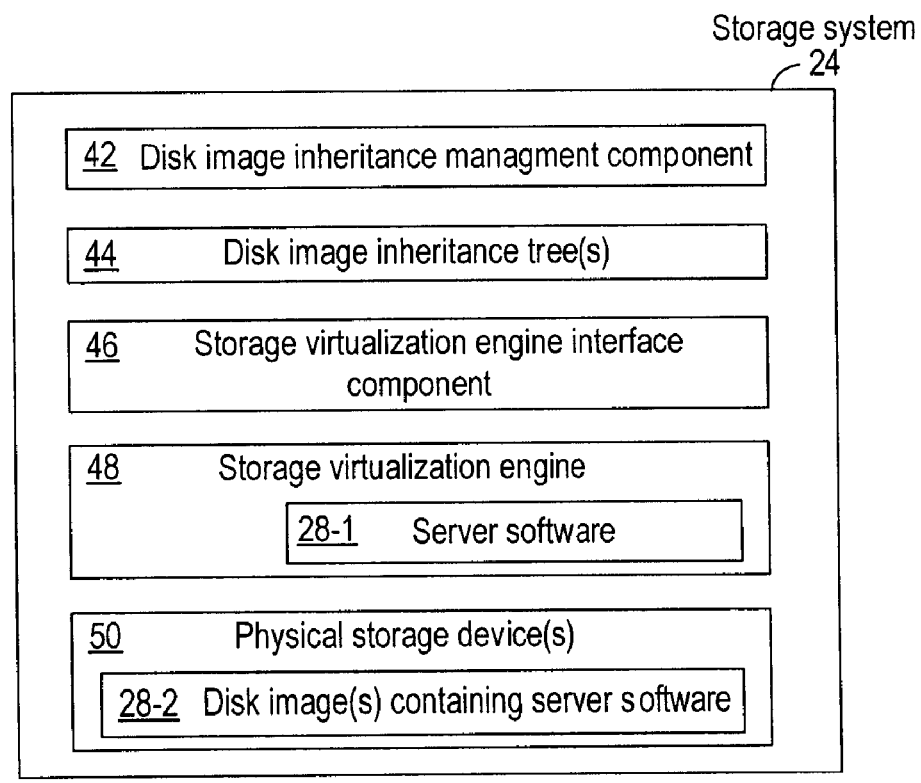
FIG. 2 depicts a diagram of an embodiment of the storage system of FIG. 1.

FIG. 2 depicts a diagram of an embodiment of the storage system 24 of FIG. 1. A disk image inheritance management component 42 maintains at least one disk image inheritance tree 44, which is also referred to as an inheritance tree. In some embodiments, the storage system 24 has a single inheritance tree. In other embodiments, the storage system 24 has a plurality of inheritance trees. A storage virtualization engine interface component 46 provides an interface to a storage virtualization engine 48. In some embodiments, the storage virtualization engine 48 provides at least one and typically a plurality of virtual disks, and communicates with one or more physical storage devices 50. In various embodiments, the server software 28-1 is provided using a virtual disk. A physical storage device provides persistent storage and is typically a disk. The physical storage device(s) 50 provides a repository for storing the disk image(s) containing the server software 28-2 associated with the inheritance tree(s) 44. In various embodiments the physical storage device(s) are managed disks, and the virtual disks are stored on the managed disks.

Various embodiments will be described with respect to an application server and application server software. However, some embodiments of the present invention apply to other types of servers and server software.

Figure 3:
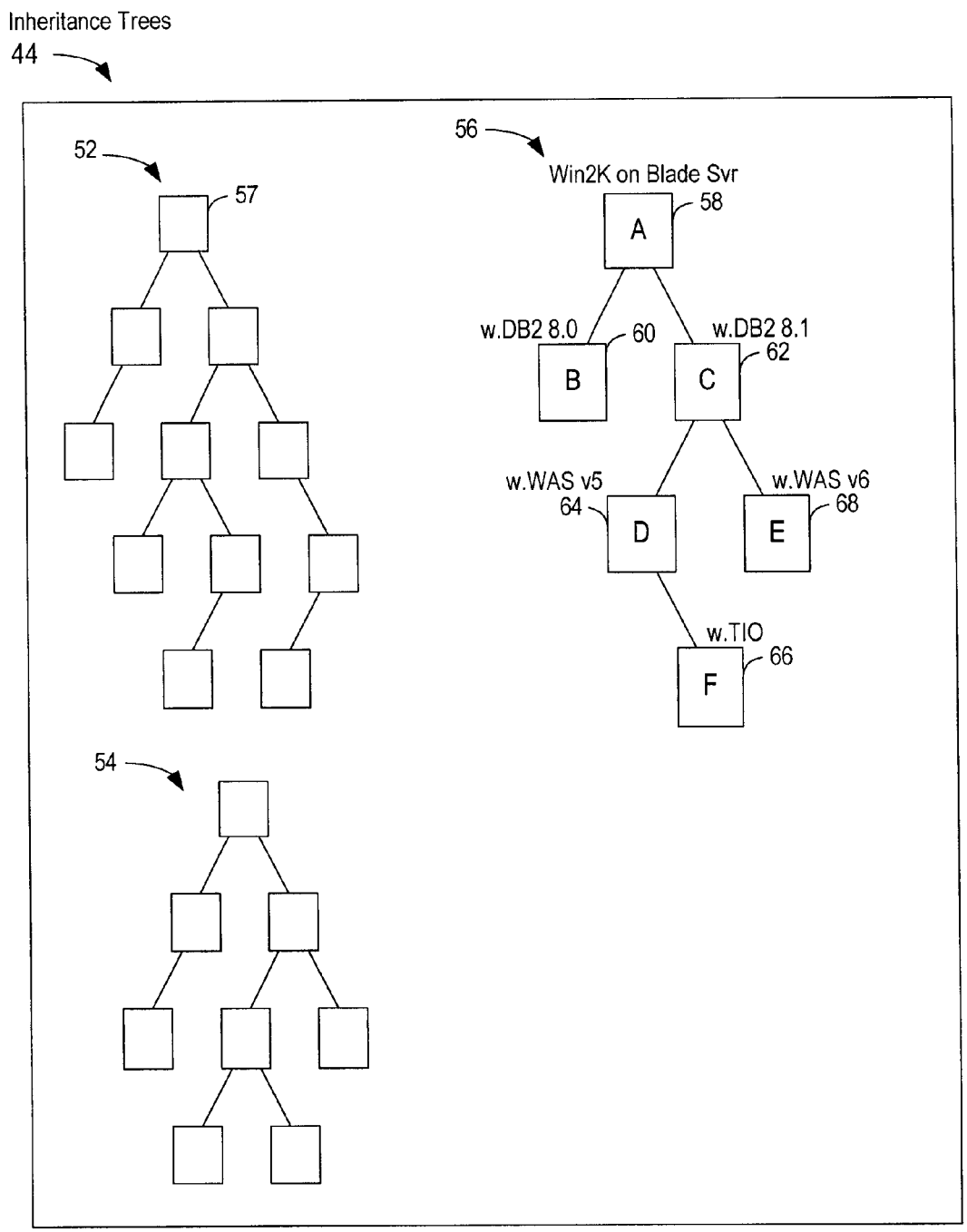
FIG. 3 depicts a diagram illustrating three exemplary inheritance trees of the storage system of FIG. 2.

FIG. 3 depicts a diagram illustrating three exemplary inheritance trees 52, 54 and 56 of the storage system 24 of FIG. 2. In various embodiments, an inheritance tree 52, 54 and 56 indicates various heritage relationships among software applications that have a common root. Software applications are typically installed sequentially such that the installation of one software application is complete prior to starting the installation of another software application. In some embodiments, the heritage relationship depends on the order of installation of the software applications.

An inheritance tree has at least one node, and typically has a plurality of nodes. A node may have one or more child nodes. A node that has at least one child node is referred to as a parent node. A root node has no parent node. The exemplary inheritance trees 52, 54 and 56 comprise a plurality of nodes 57.

The phrase "application stack" refers to the one or more software applications that make up the application server software. For example, an application stack may comprise a DB2 v8.0 server installed on a Windows 2000 server.

Each node 57 of an inheritance tree corresponds to a disk image containing the application server software of an application server. Each disk image has a disk image name and a timestamp indicating a time of creation of the disk image. In some embodiments, each disk image associated with the same inheritance tree has the same disk image name and a different value of the timestamp. In other embodiments, the disk images of an inheritance tree have different disk image names. In various embodiments, the disk image name identifies a virtual disk. In other embodiments, the disk image name identifies a physical disk or a portion of a physical disk.

In various embodiments, each disk image is also associated with an application stack name. Each node 57 also corresponds to the application stack of the application server software of the corresponding disk image. The application stack name is provided by the user and is used to identify a particular distinguishing software application of the disk image such as the most recently added software application of the disk image. In some embodiments, the application stack name of the root node comprises the name of the root software application with a machine type. In other embodiments, an inheritance tree is also associated with a machine type, for example, a particular blade server, and the application stack name of the root node comprises the name of the root software application without a machine type. The application stack name is used to provide a list of all the software applications of the application stack. For example, in some embodiments, the software applications of an application stack of a particular node can be identified by displaying the application stack name of the particular node and the application stack name of all its ancestor nodes.

Exemplary inheritance tree 56 will now be described. Inheritance tree 56 has a root node 58, labeled "A," that corresponds to a disk image that comprises a Windows 2000 server that executes on a blade server. In this description, the Windows 2000 server that executes on a blade server will be referred to as the Windows 2000 server. The disk image that corresponds to the root node 58 is also referred to as a root disk image. This root disk image has an exemplary disk image name of "Win2K" and the exemplary timestamp is "200608230600" which in this example corresponds to Aug. 23, 2006 at 6:00 am. The application stack name of this disk image is "Win2K on Blade Svr" and is shown in the diagram of the inheritance tree 56. The disk image that corresponds to node 58 can be used for provisioning other application servers that comprise the Windows 2000 server and in some embodiments for recovery of an application server. The root node of the inheritance tree typically corresponds to a disk image containing a first software application that is installed to provision application server software. The first software application is typically an operating system.

In this example, a user installs the DB2 v8.0 server on the disk that comprises the Windows 2000 server, and makes a disk image of the disk. In some embodiments, the user is a system administrator. This exemplary disk image is also named "Win2K" and has an exemplary timestamp of "200608230800" which in this example corresponds to Aug. 23, 2006 at 8:00 am. The application stack name of this disk image is "w.DB2 8.0" which indicates the new software application. This disk image can be used to provision application server software comprising the DB2 8.0 server on the Windows 2000 server. In the inheritance tree 56, node 60, labeled "B" corresponds to the disk image named "Win2K" with the timestamp of "200608230800". Node 60 is a child of node 58. Therefore, the exemplary disk image named "Win2K" with the timestamp of "200608230800" is a child disk image of the exemplary disk image named "Win2K" with a timestamp of "200608230600". Node 58 is a parent of node 60. The disk image named "Win2K" 58 with the timestamp of "200608230600" is a parent of the disk image named "Win2K" with the timestamp of "200608230800".

In this example, the user also installs the DB2 v8.1 server on a disk comprising the Windows 2000 server, and makes a disk image of that disk. This exemplary disk image is named "Win2K" and has a timestamp of "200608231000". The application stack name of this disk image is "w.DB2 v8.1". Node 62, labeled "C," corresponds to the disk image named "Win2K" with the timestamp of "200608231000". The disk image named "Win2K" with the timestamp of "200608231000" can be used to provision application server software comprising the DB2 8.1 server on a Windows 2000 server. Node 62 is a child of node 58. The disk image named "Win2K" with the timestamp of "200608231000 is a child of disk image "Win2K" with a timestamp of "200608230600." Node 58 is a parent of node 62. The disk image named "Win2K" 58 with the timestamp of "200608230600" is a parent of the disk image named "Win2K" with the timestamp of "200608231000".

The user installs the WebSphere Application Server v5 on a disk comprising a copy of the disk image "Win2K" with a timestamp of "200608231000" and makes a disk image of that disk. This disk image is named "Win2K" and has a timestamp of "200608231200". The application stack name of this disk image is "w.WAS v5". Node 64, labeled "D," corresponds to the disk image named "Win2K" with the timestamp of "200608231200". The disk image named "Win2K" with the timestamp of "200608231200" comprises WebSphere Application Server v5, the DB2 8.1 server and the Windows 2000 server. Node 64 is a child of node 62. The disk image named "Win2K" with the timestamp of "200608231200" is a child of the disk image named "Win2K" with the timestamp of "200610151000". Node 62 is a parent of node 64, and the disk image named "Win2K" with the timestamp of "200608231000" is a parent of the disk image named "Win2K" with the timestamp of "200608231200".

The user then installs Tivoli® (Registered Trademark of IBM Corporation) Intelligent Orchestration on a disk having a copy of the disk image named "Win2K" with the timestamp of "200608231200" and makes another disk image. This disk image is named "Win2K" and has a timestamp of "200608231400". The application stack name of this disk image is "w. TIO". Node 66, labeled "F", corresponds to the disk image named "Win2K" with the timestamp of "200608231400". The disk image named "Win2K" with the timestamp of "200608231400" comprises Tivoli Intelligent Orchestration, WebSphere Application Server v5, the DB2 8.1 server and the Windows 2000 server. Node 66 is a child of node 64. The disk image named "Win2K" with the timestamp of "200608231400" is a child of the disk image named "Win2K" with the timestamp of "200608231200".

In addition, the user installs WebSphere Application Server v6 on a disk comprising the DB2 8.1 server on the Windows 2000 server, and makes a disk image. This disk image is named "Win2K" and has a timestamp of "200608231600". The application stack name of this disk image is "w. WAS v6". In the inheritance tree, node 68, labeled "E", corresponds to the disk image named "Win2K" with the timestamp of "200608231600".

In the exemplary inheritance tree 56, the root disk image has a single software application. In other embodiments, the root disk image comprises a plurality of software applications. In addition, in the exemplary inheritance tree 56, a child disk image has one software application that differs from the software application(s) of its parent disk image. In other embodiments, a child disk image has a plurality of software applications that are different from the software application(s) of its parent disk image.

A child node has one or more ancestor nodes. A parent node is an ancestor of its child node, and the ancestors of a child node continue up to the root node. For example, the ancestors of node 66, labeled "F", comprise nodes 64, 62 and 58.

Figure 4:
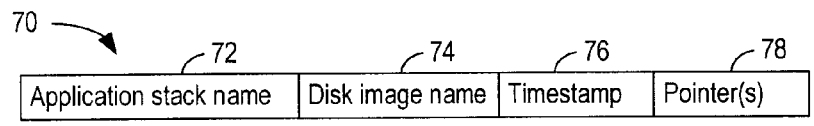
FIG. 4 depicts an embodiment node of an inheritance tree of FIG. 3.

FIG. 4 depicts an embodiment of a node 70 of an inheritance tree of FIG. 3. The node 70 comprises an application stack name (Application stack name) 72, a disk image name (Disk image name) 74, a timestamp (Timestamp) 76 and at least one pointer (Pointer(s)) 78. The disk image name 74 is the name of the disk image. The timestamp 76 indicates the time of creation of the disk image. The pointer(s) 78 refer to a node associated with a parent disk image, if any, and node(s) associated with child image(s), if any, of the disk image that is specified by the disk image name 74 and timestamp 76. The combination of the disk image name 74 and timestamp 76 are used to identify a particular disk image in the physical storage device(s). For example, in some embodiments, the disk images of an inheritance tree have the same name and are differentiated by their timestamp. In various embodiments, the application stack name is presented to a user to identify a desired application stack, and the disk image is identified based on the disk image name and timestamp associated with the application stack name. In some embodiments, the application stack name is omitted.

Figure 5A:
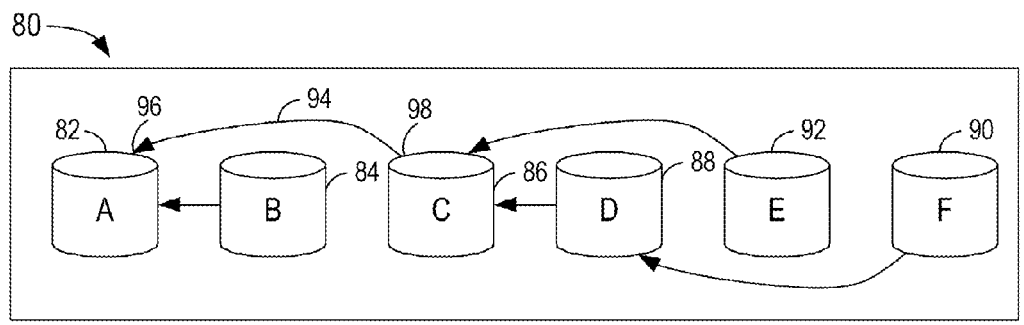
FIGS. 5A, 5B, 5C and 5D illustratively depict various aspects of an embodiment of disk image inheritance of the storage system of FIG. 2.

FIGS. 5A, 5B, 5C and 5D illustratively depict various aspects of an embodiment of a technique of disk image inheritance of the storage system of FIG. 2. FIG. 5A illustrates the relationships of the disk images corresponding to inheritance tree 56 of FIG. 3. Disk images 82, 84, 86, 88, 90 and 92 of FIG. 5A correspond to nodes 58, 60, 62, 64, 66 and 68, respectively, of FIG. 3. In FIG. 5A, the exemplary disk images 82, 84, 86, 88, 90 and 92 are also shown with the label, "A", "B", "C", "D", "F" and "E", respectively, of the corresponding node. The arrows 94 indicate a parent-child relationship. The tip 96 of the arrow 94 points to the parent disk image, and the other end 98 of the arrow 94 is at the child disk image. For example, the disk image 82 has a name of "Win2K" with a timestamp of "200608230600" and corresponds to node 58 of the inheritance tree 56 of FIG. 3. The disk image 86 has a name of "Win2k" with a timestamp of "200608231000" and corresponds to node 62 of the inheritance tree 56 of FIG. 3. As illustrated by arrow 94, disk image 82 is a parent of child disk image 86. In various embodiments, FIG. 5A, the disk images 82, 84, 86, 88, 90 and 92 are stored on one or more physical disks.

In response to generating a new disk image comprising a new software application that is installed on a copy of an existing disk image that is associated with an existing node of an inheritance tree, the disk image inheritance management component 42 (FIG. 2) records the heritage relationship of the new disk image in the inheritance tree. In various embodiments, a single inheritance tree is used to store multiple heritage relationship topologies which comprise many, and in some embodiments all, of the application server software options. In some embodiments, multiple inheritance trees are created to store multiple heritage relationship topologies that encompass many, and in some embodiments all, application server software options and each inheritance tree has different a different software application on its root disk image.

An application server is allocated a specified number of data blocks of disk storage for the application server software. A disk image of the application server's disk storage also comprises the allocated number of data blocks. In various embodiments, the content of many data blocks of a child disk image is the same as the content of the data blocks of its parent disk image, and these data blocks are referred to as being the same. In various embodiments, a difference monitoring component of the storage virtualization engine 48 (FIG. 2) identifies one or more data blocks that have different content between the parent and child disk images, and these data blocks are referred to as different data blocks.

Figure 5B:
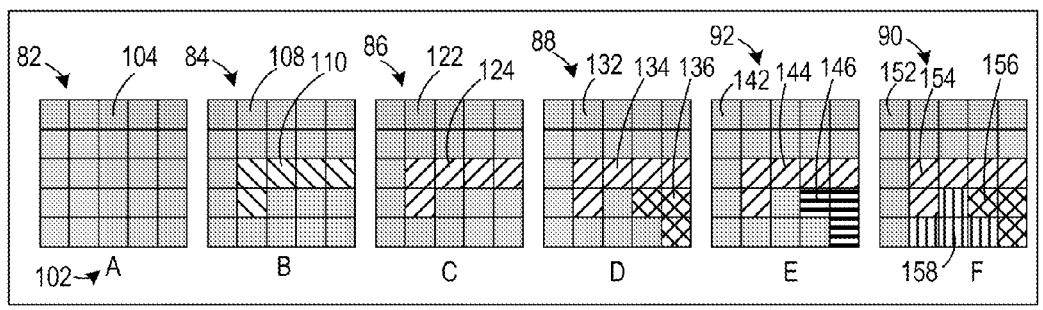

FIG. 5B graphically illustrates the differences between the illustrative disk images of FIG. 5A. The labels 102 of the corresponding nodes are shown below the disk images 82, 84, 86, 88, 90 and 92. The first disk image 82 comprises only the root software application associated with node "A" 58 of FIG. 3. Each square 104 represents a data block. The first disk image 82 comprises a plurality of data blocks 104 which are shaded. In various embodiments, the root software application uses less than all of the data blocks that are allocated to the application server, and therefore less than all data blocks of the first disk image 82. In this example, the root software application is the Windows 2000 server.

The second disk image 84 is associated with node "B" 60 of FIG. 3. The second disk image 84 is a child disk image of the first disk image 82. The storage virtualization engine compares the data blocks of the first and second disk images, 82 and 84, respectively, and identifies the different data blocks. The data blocks 108 of the second disk image 84 that are the same as in the first disk image 82 are indicated using the same shading as in the first disk image 82. The data blocks 110 of the second disk image that are different from the first disk image 82 are hatched, and not shaded. In this example, the first disk image comprises the Windows 2000 server; and the second disk image comprises the DB2 8.0 server on the Windows 2000 server. In this example, the data blocks 110 which are different result from the installation of the DB2 8.0 server.

The third disk image 86 is associated with node "C" 62 of FIG. 3. The storage virtualization engine compares the data blocks of the first and third disk images, 82 and 86, respectively, and identifies the different data blocks. The data blocks 122 of the third disk image 86 that are the same as in the first disk image 82 are shaded as in the first disk image 82. The data blocks 124 which are different from the first disk image 82 are hatched, and not shaded. The third disk image 86 comprises the DB2 8.1 server installed on a Windows 2000 server. In this example, the data blocks 120 which are different result from the installation of the DB2 8.1 server.

The fourth disk image 88 is associated with node "D" 64 of FIG. 3. The fourth disk image 88 is a child of the third disk image 86 which is a child of the root disk image 82. The fourth disk image 88 comprises WAS v5, the DB2 8.1 server, and the Windows 2000 server. The storage virtualization engine compares the data blocks of the third and fourth disk images, 86 and 88, respectively, and identifies the different data blocks. The data blocks 136 which are changed in response to the installation of WAS v5, and therefore different from the third disk image 86, are cross-hatched. The data blocks 132 that are the same as in the first and third disk images 82 and 86 are shaded as in the first and third disk images 82 and 86, respectively. The data blocks 134 that are the same as the changed data blocks of the third disk image 86 are hatched as in the third disk image 86.

The fifth disk image 92 is associated with node "E" 68 of FIG. 3. The fifth disk image 92 is a child disk image of the third disk image 86 which is a child disk image of the root disk image 82. The fifth disk image 92 comprises WAS v6, the DB2 8.1 server and the Windows 2000 server. The storage virtualization engine compares the data blocks of the third and fifth disk images, 86 and 92, respectively, and identifies the data blocks which are different. The data blocks 146 which are different from the third disk image 86 are indicated with parallel horizontal lines. In this example, the data blocks 146 which are different result from the installation of WAS v6. The data blocks 142 of the fifth disk image 92 that are the same as in the first and third disk images 82 and 86 are shaded as in the first and third disk images, 82 and 86, respectively. The data blocks 144 of the fifth disk image 92 that are the same as the changed data blocks of the disk third image 86 are hatched as in the third disk image 86.

The sixth disk image 90 is associated with node "F" 66 of FIG. 3. The sixth disk image 90 is a child disk image of the fourth disk image 88 which is a child disk image of the third disk image 86 which is a child of the root disk image 82. The sixth disk image 90 comprises TIO, WAS v5, the DB2 8.1 server and the Windows 2000 server. The storage virtualization engine compares the data blocks of the sixth and fourth disk images, 90 and 88, respectively. The data blocks 158 which are different from the fourth disk image 88, are hatched with parallel vertical lines. In this example, the data blocks 158 which are different result from the installation of TIO. The data blocks 152 that are the same as in the first, third and fourth disk images, 82, 86 and 88 are shaded as in the first, third and fourth disk images, 82, 86 and 88, respectively. The data blocks 154 that are the same as the changed data blocks of the third disk image 86 and the fourth disk image 88 are hatched as shown in the third disk image 86 and the fourth disk image 88. The data blocks 156 that are the same as the changed data blocks of the fourth disk image 88 are cross-hatched as in the fourth disk image 88.

The disk images are stored in at least one physical storage device. The storage virtualization engine 48 of FIG. 2 maps one or more data blocks of the disk image into one or more storage blocks of a storage device. Typically, all of the data blocks of a new root disk image are mapped to one or more new storage blocks. In various embodiments, a child disk image is considered to inherit at least one data block of its parent disk image. The child disk image inherits each data block which is the same as in its parent disk image. Typically, for a child disk image, the storage virtualization engine creates at least one new storage block for the one or more data blocks that are different from its parent disk image, and the different data block or blocks of the child disk image are stored in the new storage block(s). In various embodiments, the storage virtualization engine maps each data block of the child disk image that is different from its parent disk image to one or more new storage blocks. The one or more data blocks of the child disk image that are the same as in its parent disk image are not mapped to the new storage block(s) and the existing mapping of those data blocks is used for the child disk image. The storage virtualization engine stores the mapping in a data structure. In some embodiments, a child disk image is considered to share data block(s) with its parent disk image even when a data block is shared with an ancestor disk image of its parent disk image. In various embodiments, at least one data block of at least one storage block of an ancestor disk image of a child disk image is shared with the child disk image. In various embodiments, since at least one data block of a child disk image is different from its parent's data blocks, sharing one or more data blocks that are the same as in an ancestor disk image will reduce consumption of storage space. Therefore, various embodiments of the present invention efficiently store disk images.

Figure 5C:
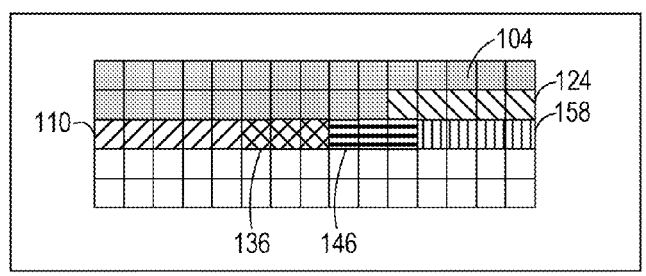

FIG. 5C illustratively depicts data blocks that are stored in the storage blocks in persistent storage. The storage virtualization engine stores all the data blocks 104 of the first or root disk image 82 (FIG. 5B). For the child disk images 84, 86, 88, 90 and 92, the storage virtualization engine maps one or more data blocks that are different from their respective parent disk images, 110, 124, 136, 146, and 158 to at least one storage block. The storage virtualization engine stores the one or more data blocks of the child disk images 84, 86, 88, 90 and 92 that are different from their respective parent disk images in at least one storage block in at least one storage device.

Figure 5D:
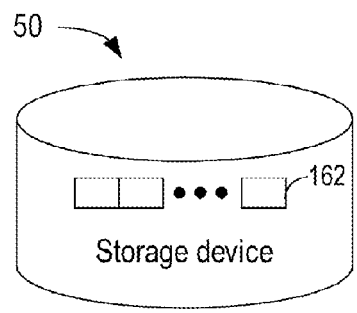

FIG. 5D depicts an illustrative physical storage device 50-1 of the storage system 24 of FIG. 2. The storage device 50-1 provides persistent storage. The data blocks of FIG. 5C are stored in the storage blocks 162 of storage device 50-1. In some embodiments, a storage block 162 stores the same amount of data as a data block. In other embodiments, a storage block 162 stores an amount of data corresponding to a plurality of data blocks. In some embodiments, the storage blocks have the same size. In other embodiments, the storage blocks have different sizes.

The storage virtualization engine maps the location of the data blocks and storage blocks of the disk images in the storage device. The storage virtualization engine contains the location and mapping of the data blocks of the root disk image to the storage blocks of the persistent storage. The storage virtualization engine contains and maintains, for each child disk image, a mapping of the location of the shared data block(s) to storage block(s), in addition to a mapping of the location of different data block(s) to storage block(s).

Figure 6:
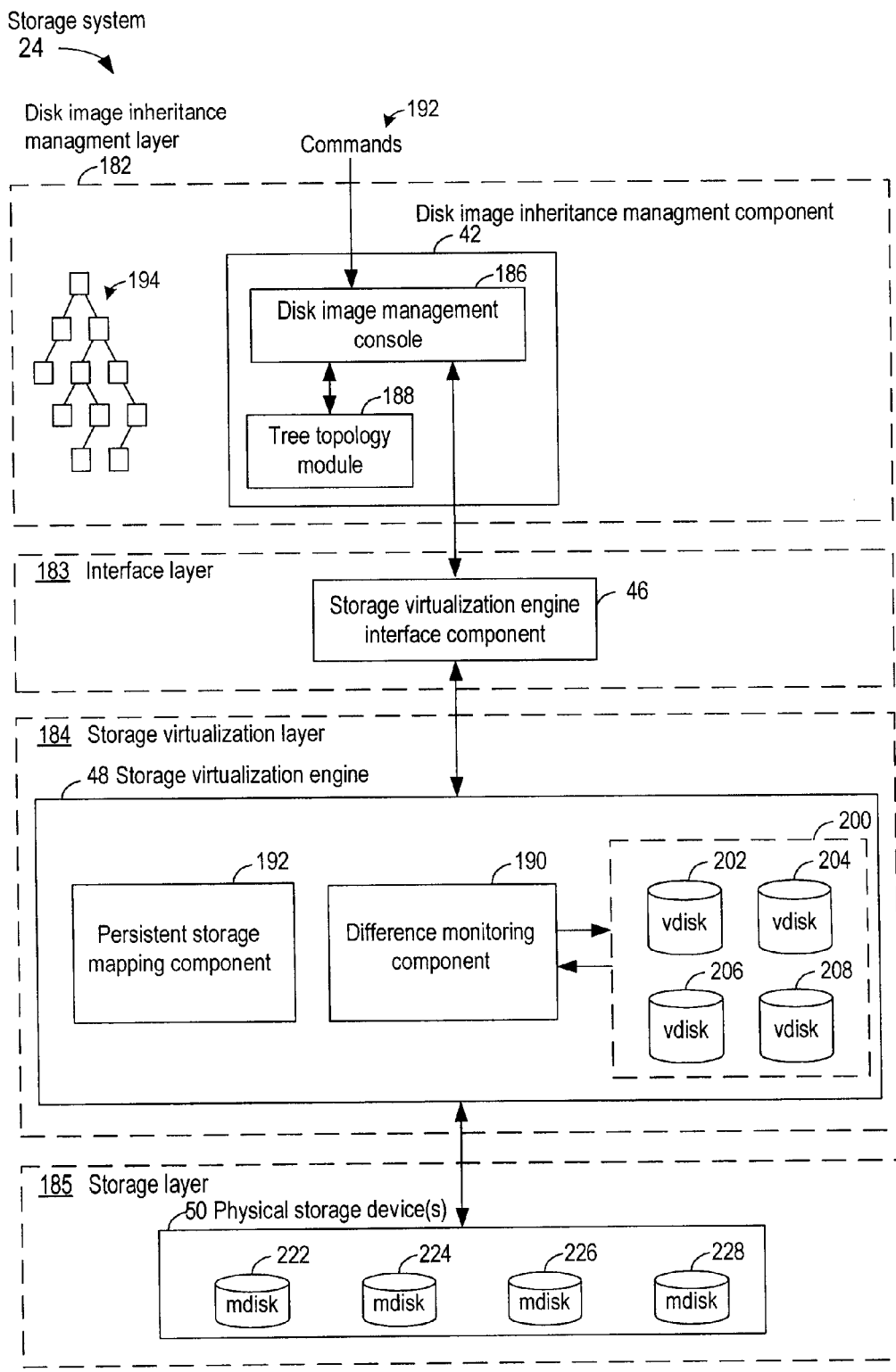
FIG. 6 depicts a diagram of another embodiment of the storage system of FIG. 1.

FIG. 6 depicts a diagram of another embodiment of the storage system 24 of FIG. 1. In various embodiments, the storage system 24 is a storage area network (SAN).

In some embodiments, the storage system 24 is implemented in layers. The layers comprise a disk image inheritance management layer 182, an interface layer 183, a storage virtualization layer 184 and a storage layer 185. The disk image inheritance management layer 182 comprises the disk image inheritance management component 42. The interface layer 183 comprises the storage virtualization engine interface component 46. The storage virtualization layer 184 comprises the storage virtualization engine 48. The storage layer 185 comprises storage device(s) 50. In other embodiments, layers are not used.

The disk image inheritance management component 42 comprises a disk image management console 186 and a tree topology module 188. The disk image management console 186 provides a user interface. The disk image management console 186 is implemented using one or more software modules. In various embodiments, the disk image management console 186 provides a command line interface. In some embodiments, the disk image management console provides a graphical user interface. The disk image management console 186 receives and processes commands 192, from a user. At least one of the commands 192 is to provision application server software using an existing disk image. At least another one of the commands is to create or generate a new disk image. The tree topology module 188 maintains one or more inheritance trees 194 corresponding to the disk images of the application server software that are stored in the physical storage device(s) 50. In some embodiments, the disk image management console 186 graphically presents at least one inheritance tree, for example, as illustrated in FIG. 3, on a display. The disk image management console 186 communicates with the storage virtualization engine interface component 46. In some embodiments, the disk image management console 186 is accessed at the storage system, and in other embodiments the disk image management console 186 is accessed by a user at a computer via a network.

The storage virtualization engine interface component 46 provides a programming interface to the storage virtualization engine 48. In some embodiments, the storage virtualization engine interface component 46 is separate from the storage virtualization engine 48; in other embodiments, the storage virtualization engine interface component 46 is included in the storage virtualization engine 48. The storage virtualization engine interface component 46 receives storage system commands from the disk image management console 186 and invokes the storage virtualization engine 48 to process the storage system commands. In various embodiments, the storage virtualization engine interface component 46 is implemented as part of a storage virtualization engine console which also provides a command line interface to the storage virtualization engine 48, and in some embodiments, a graphical user interface to the storage virtualization engine.

In some embodiments, the storage virtualization engine 48 comprises a difference monitoring component 190 and a persistent storage mapping component 192. In other embodiments, the storage virtualization engine 48 does not have a difference monitoring component and persistent storage mapping component, and performs the functions of those components. The storage virtualization engine 48 has a set 202 of one or more virtual disks 204, 206, 208, and 210. The difference monitoring component 190 accesses the set 202 of virtual disks 204, 206, 208, and 210.

In various embodiments, the physical storage device(s) 50 comprise at least one managed disk (mdisk) 222, 224, 226 and 228. The persistent storage mapping component 192 maps the data blocks of a virtual disk 202, 204, 206, 208 to the storage blocks of a managed disk 222, 224, 226 and 228. In other embodiments, the physical storage device(s) 50 are not managed disks.

In various embodiments, flash copy is used to generate a disk image which is a full image copy of a disk. The disk image is stored in one or more storage devices. In various embodiments, a disk image of a virtual disk is stored into another virtual disk. Flash copy is also referred to as a point-in-time copy or as an instance of a time-zero copy (TO). Flash copy is used to generate a root disk image comprising all allocated data blocks of a disk in persistent storage. The flash copy operation is used to copy all the data blocks of root disk image 82 (FIG. 5B) to persistent storage as illustrated in FIG. 5C. In various embodiments, the flash copy operation is IBM FlashCopy® (Registered Trademark of International Business Machines Corporation). The persistent storage mapping component 192 maps the data blocks to the storage blocks. In some embodiments, a flash copy command specifies a source disk from which a disk image is generated and a target disk on which the disk image is stored. In response to the flash copy command, the storage virtualization engine and storage virtualization interface component return a timestamp indicating a creation time of the disk image to the disk image management console.

In various embodiments, incremental flash copy is used to generate a child disk image. In various embodiments, incremental flash copy refers to generating a disk image of a disk such that each data block of the disk image that is different from its parent disk image is stored the physical storage device(s) 50, and any data block that is the same as its parent disk image is shared in the physical storage device(s) 50 as illustrated in FIGS. 5B, 5C and 5D. Incremental flash copy generates a point-in-time copy. In some embodiments, an incremental flash copy command specifies the disk for which the child disk image is generated and its parent disk image. In response to the incremental flash copy command, the storage virtualization engine and storage virtualization interface component returns a timestamp indicating a creation time of the disk image to the disk image management console.

A flash copy is also used to retrieve a specified disk image from the storage device(s) 50 and store that disk image on a specified disk, in some embodiments, a virtual disk. The persistent storage mapping component is invoked to identify and retrieve the storage blocks that contain the data blocks of the specified disk image. If the specified disk image is a child disk image, the data blocks comprise the shared storage blocks from the ancestor disk image(s) and the different data blocks of the specified child disk image. In some embodiments, a flash copy command comprises a disk image name and a timestamp to specify the disk image to copy, and a target disk to which the disk image is copied.

In response to a user request, the disk image management console 184 issues at least one storage system command to the storage virtualization engine interface component 46. The storage system commands comprise flash copy and incremental flash copy.

In response to receiving a flash copy command, the storage virtualization engine interface component 46 invokes the storage virtualization engine 48 to perform the flash copy operation. The storage virtualization engine 48 generates a disk image of the disk specified by the disk image name and timestamp to the target disk, and returns a timestamp indicating the time of creation of the disk image. In the storage virtualization engine 48, the persistent storage mapping component 192 updates a mapping of the different and shared data blocks to storage blocks for the disk image.

In response to receiving an incremental flash copy command, the storage virtualization engine invokes the difference monitoring component 190 and the persistent storage mapping component 192. The difference monitoring component 190 identifies each data block of the specified disk for which to generate a child disk image that is different from the data blocks of the specified parent disk image. The difference monitoring component 190 also identifies the data blocks of the specified disk for which to generate a child disk image that is the same as the data blocks of the specified parent disk image. The persistent storage mapping component 192 updates a mapping of the different and shared data blocks to storage blocks for the child disk image.

Figure 7:
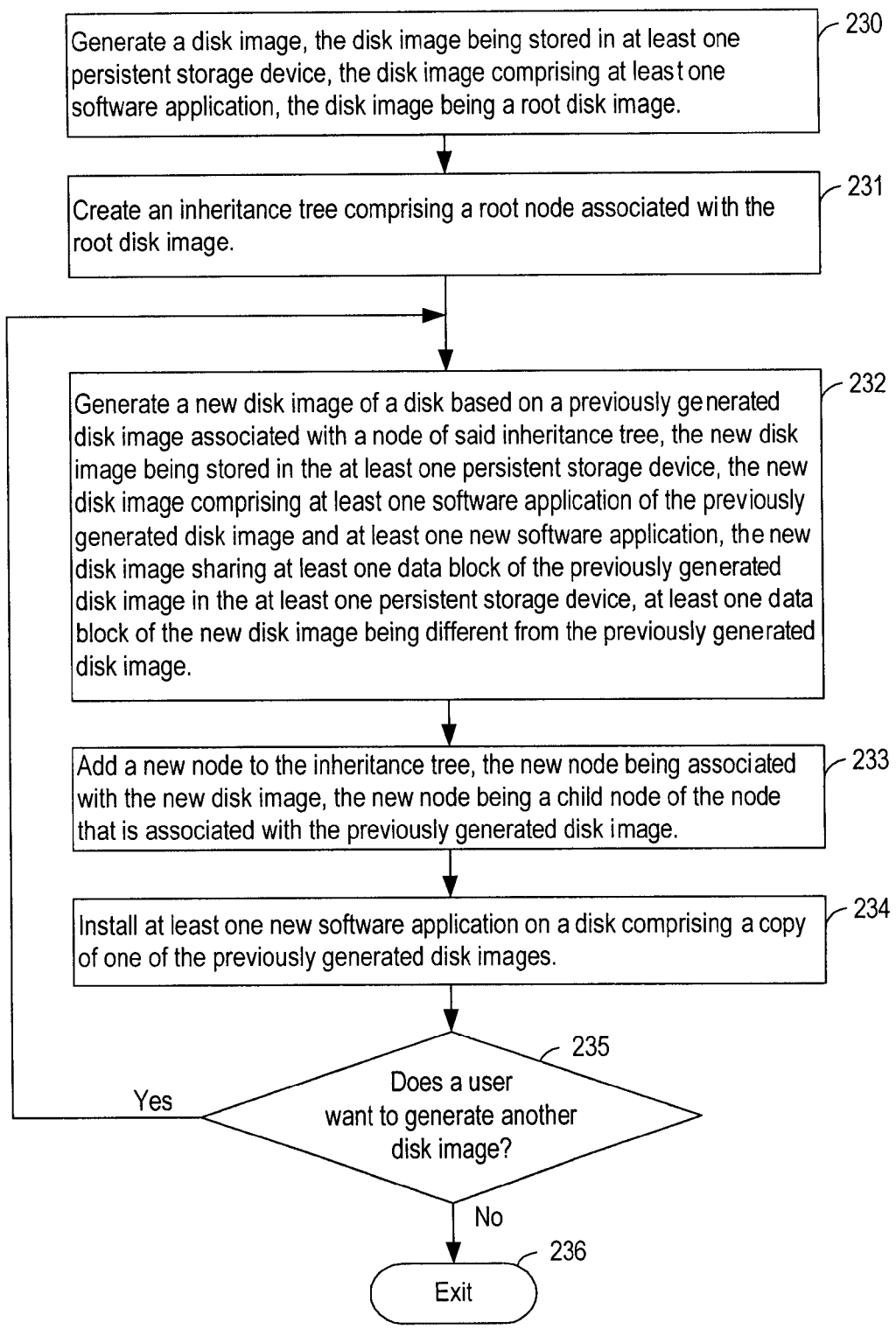
FIG. 7 depicts a flowchart of an embodiment of managing disk images for server provisioning.

FIG. 7 depicts a flowchart of an embodiment of managing disk images for server provisioning. In step 230, a disk image is generated. The disk image is stored in at least one persistent storage device. The disk image comprises at least one software application and is a root disk image.

In step 231, an inheritance tree comprising a root node associated with the root disk image is created.

In step 232, a new disk image of a disk is generated based on a previously generated disk image associated with a node of the inheritance tree. The new disk image is stored in the at least one persistent storage device. The new disk image comprises at least one software application of the previously generated disk image and at least one new software application. The new disk image shares at least one data block of the previously generated disk image in the at least one persistent storage device. At least one data block of the new disk image is different from the previously generated disk image.

In step 233, a new node is added to the inheritance tree. The new node is associated with the new disk image. The new node is a child node of the node that is associated with the previously generated disk image.

In step 234, at least one new software application is installed on a disk comprising a copy of one of the previously generated disk images.

Step 235 determines whether a user wants to generate another disk image. If so, step 235 proceeds to step 232. If not, step 235 proceeds to step 236 and the flowchart exits.

Figures 8, 8A, 8B:
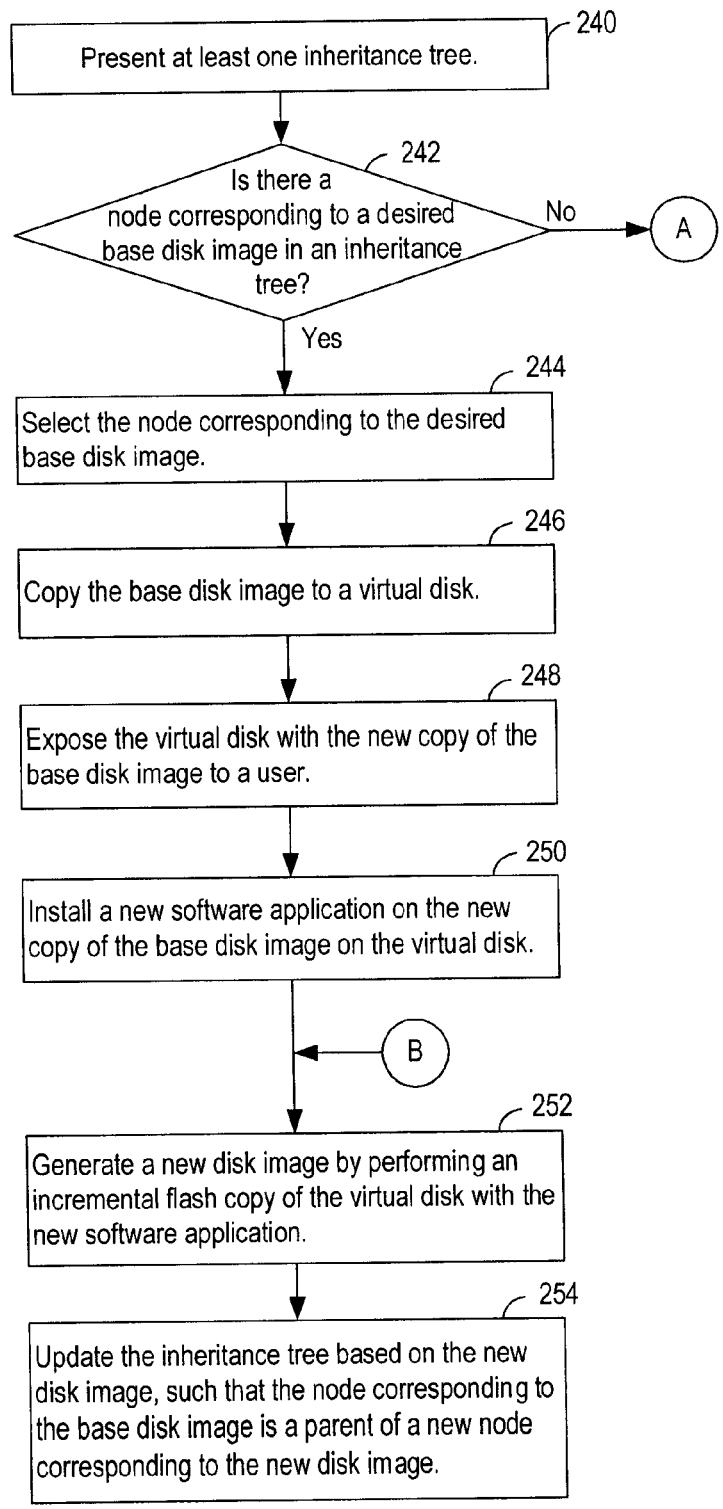
FIG. 8 comprises FIGS. 8A and 8B which collectively depict a flowchart of an embodiment of managing disk images for server provisioning.
Figure 8B:
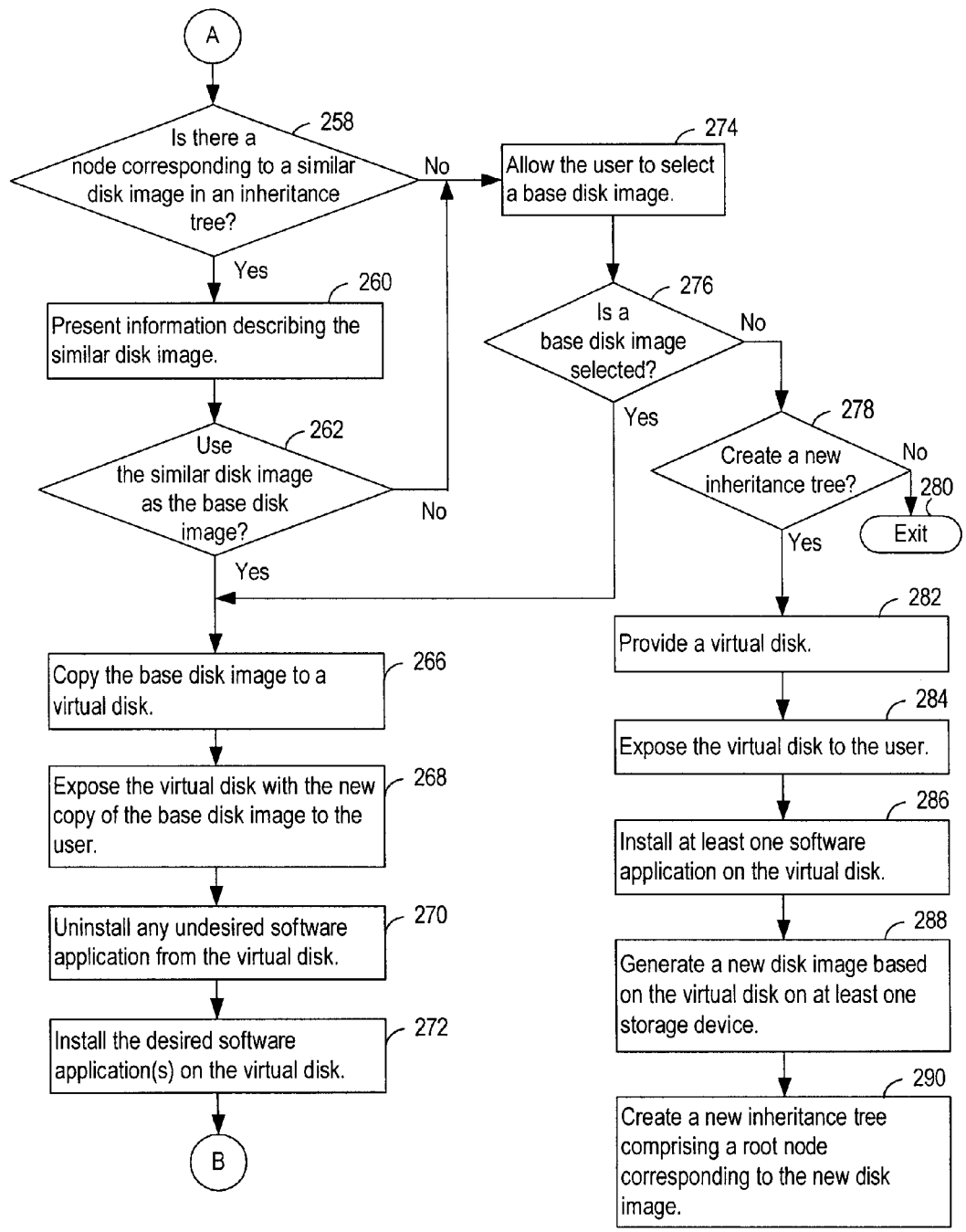

FIG. 8 comprises FIGS. 8A and 8B which collectively depict a flowchart of an embodiment of managing disk images for server provisioning. In step 240, the disk image management console presents an inheritance tree. In some embodiments, step 240 is omitted.

Step 242 determines whether there is a node corresponding to a desired base disk image in an inheritance tree. In some embodiments, a user performs step 242.

In other embodiments, the disk image management console performs step 242. The disk image management console receives a specified machine type and the desired topology of the application server software from the user. The desired topology specifies at least one software application. The disk image management console determines whether a desired base disk image is in the inheritance tree based on the machine type and specified software application(s) of the desired topology. The disk image management console identifies at least one candidate inheritance tree based on the machine type of the inheritance tree matching the specified machine type. In other embodiments a separate machine type is not received and the machine type is included in the name of the specified root software application; and the disk image management console identifies a candidate inheritance tree based on the application stack name of the root node matching the name of the specified root software application.

The disk image management console traverses the nodes of the candidate inheritance tree to identify a node that is associated with a disk image comprising all specified software application(s) based on the application stack name of the nodes. For example, if the specified software applications are the "Windows 2000 server" and the "DB2 8.0 server", the disk image management console searches for a root node having an application stack name of "Windows 2000 server", and searches the child nodes of the root node for an application stack name of "DB2 8.0" server. In response to finding a root node having an application stack name of "Windows 2000 server" that has a child node having an application stack name of "DB2 8.0" server, the disk image management console determines that the candidate inheritance tree has a node corresponding to the desired base disk image. The child node with the application stack name of "DB2 8.0 server" is identified as corresponding to the desired base disk image.

In response to step 242 determining that a node corresponding to the desired base disk image is in an inheritance tree, in step 244, the node corresponding to the base disk image is selected. In some embodiments, the user manually selects the node corresponding to the base disk image, in some embodiments using a command line interface and in other embodiments using a graphical user interface. In various embodiments, the disk image management console selects the child node determined to correspond to the desired base disk image of step 242. In various embodiments, the name of the base disk image and associated timestamp are retrieved from the child node that is determined to correspond to the desired base disk image.

In step 246, the base disk image is copied to a virtual disk. In various embodiments, the disk image management console issues a flash copy command with the name and timestamp of the base disk image, and a specified virtual disk, to the storage virtualization engine interface component. The storage virtualization interface component invokes the storage virtualization engine to copy the base disk image from the storage device(s) to the specified virtual disk. Alternately, a copy command other than flash copy is issued.

In step 248, the disk image management console exposes the virtual disk with the new copy of the base disk image to the user. The virtual disk is made available to the user.

In step 250, a new software application is installed on the new copy of the base disk image on the virtual disk. In various embodiments, the user installs the new software application. In other embodiments, the disk image management console, in response to the user, automatically installs the new software application.

In step 252, a new disk image is generated by performing an incremental flash copy of the virtual disk with the new software application. In various embodiments, the new disk image has the same name as the base disk image and a different timestamp. In some embodiments, in response to a request from the user at the disk image management console, the disk image management console issues a command to perform an incremental flash copy of the virtual disk with the new software application with respect to its selected base disk image.

In step 254, the tree topology module updates the inheritance tree based on the new disk image such that the node corresponding to the base disk image is a parent of a new node corresponding to the new disk image. The disk image management console invokes the tree topology module. The tree topology module adds a new node corresponding to the new disk image as a child disk image of the node corresponding to the selected base disk image in the inheritance tree. The new node comprises a name of the application stack, the name of the disk image, the timestamp indicating the time of the generation of the disk image by the incremental flash copy, and a pointer to the node in the inheritance tree corresponding to its parent disk image. In addition, the tree topology module updates the pointer(s) of the node corresponding to the base disk image by adding a pointer to the node corresponding to its new child disk image. The user typically provides the name of the application stack. In some embodiments, step 254 is automatically performed after step 252 is completed.

If step 242 determines that a node corresponding to the desired base disk image is not in an inheritance tree, the flowchart proceeds via Continuator A to step 258 of FIG. 8B. In step 258, the disk image management console determines whether there is a node corresponding to a similar disk image in the inheritance tree. In some embodiments, the user identifies a similar disk image. In other embodiments, the disk image management console identifies a similar disk image based on the specified software application(s) and machine type. The disk image management console determines whether an inheritance tree has a disk image corresponding to the specified root software application and machine type. If so, the disk image management console identifies a node of that inheritance tree corresponding to a disk image that contains the greatest number of the specified software applications as the node corresponding to a similar disk image. The similar disk image contains less than all of the specified software applications of the request.

In response to determining that there is a node corresponding to a similar disk image in an inheritance tree, in step 260, the information describing the similar disk image is presented to the user. In some embodiments, the information is presented by highlighting a graphical image representing the node on a graphical user interface; in other embodiments, the information is presented by listing the software application(s) of its application stack, its disk image name and timestamp.

Step 262 determines whether the user wants to use the similar disk image as the base disk image. For example, the disk image management console may present a prompt asking if that user wants to use the similar disk image as the base disk image. If the user does not, step 262 proceeds to step 274.

In response to the user affirmatively indicating using the similar disk image as the base disk image, in step 266, the base disk image is copied to a virtual disk. The disk image inheritance management component retrieves the disk image name and timestamp of the base disk image, in this case the similar disk image, from its corresponding node, and issues a flash copy command to the storage virtualization interface component with the disk image name, timestamp, and a specified virtual disk.

In step 268, the virtual disk with the new copy of the base disk image is exposed to the user.

In step 270, the user uninstalls any undesired software application from the virtual disk. In some embodiments step 270 is omitted.

In step 272, the user installs the desired software application on the virtual disk. In various embodiments, desired software application is a new software application. In some embodiments, the desired software application is an upgrade to an existing software application. The flowchart proceeds via Continuator B to step 252 of FIG. 8A.

In response to step 258 determining that there is not a node corresponding to a similar disk image in an inheritance tree, in step 274, the disk image management console allows a user to select a base disk image from an inheritance tree. Step 276 determines whether a base disk image is selected. In response to selecting a base disk image, the disk image management component proceeds to step 266.

In response to a user not selecting a base disk image in step 276, in step 278, the disk image management console determines whether the user wants to create a new inheritance tree. If not, in step 280, the flowchart exits. If so, in step 282, the disk image management console provides a virtual disk. The virtual disk has no software application.

In step 284, the disk image management console causes the virtual disk to be exposed to the user. In step 286, the user installs at least one software application on the virtual disk.

In step 288, a new disk image is generated based on the virtual disk on at least one storage device. In various embodiments, the disk image management console issues a flash copy command to generate the new root disk image and store it on the storage device(s).

In step 290, the tree topology module of the disk image management component creates a new inheritance tree comprising a root node corresponding to the new disk image. The new root node contains the name of the new disk image, the timestamp of the generation of the disk image and an application stack name. In various embodiments, the user provides the name of the disk image and the application stack name.

In an alternate embodiment, a similar disk image is not identified and steps 258, 260 and 262 are omitted, and step 242 of FIG. 8A proceeds to step 274 of FIG. 8B.

An example of the generation of a new disk image based on an existing disk image will now be described. For example, suppose a user wants to create a new disk image by installing a DB2 8.0 server on an existing Windows 2000 server on a blade server. The user communicates with the disk image management console to specify that the desired machine type is a blade server and the desired root software application is a Windows 2000 server. In step 242, the disk image management console invokes the tree topology module to determine whether there is a node corresponding to the desired base disk image, in this example, a root disk image comprising the Windows 2000 server that executes on a blade server. In response to determining that there is a root node corresponding to a disk image comprising a Windows 2000 server that executes on a blade server, in step 244, the node corresponding to the desired base disk image, in this case the root disk image comprising the Windows 2000 server that executes on a blade server, is selected.

In step 246, the base disk image is copied to a virtual disk. In step 248, this virtual disk is exposed to the user as a Windows 2000 server.

In step 250, the DB2 8.0 server is installed on the virtual disk. In this example, the user manually installs the DB2 8.0 server on the virtual disk comprising the Windows 2000 server that executes on a blade server. In response to the installation of the DB2 8.0 server, data blocks on the virtual disk are changed.

In step 252, a new disk image is generated by performing an incremental flash copy of this virtual disk. New storage blocks are generated for the data blocks that are changed by the installation of the DB2 8.0 server. As for the unchanged data blocks, the virtual disk will use its parent's storage block(s) as shared data blocks.

In step 254, the disk image management console invokes the tree topology module to update the inheritance tree. The tree topology module adds a new node corresponding to the new disk image as a node of the node corresponding to the base disk image. In some embodiments, the user, via the disk image management console, activates a graphical control that when activated causes the inheritance tree to be updated with a node corresponding to the child disk image. In other embodiments, the disk image management console receives a command from a user via the command line interface to update the inheritance tree.

Figure 9:
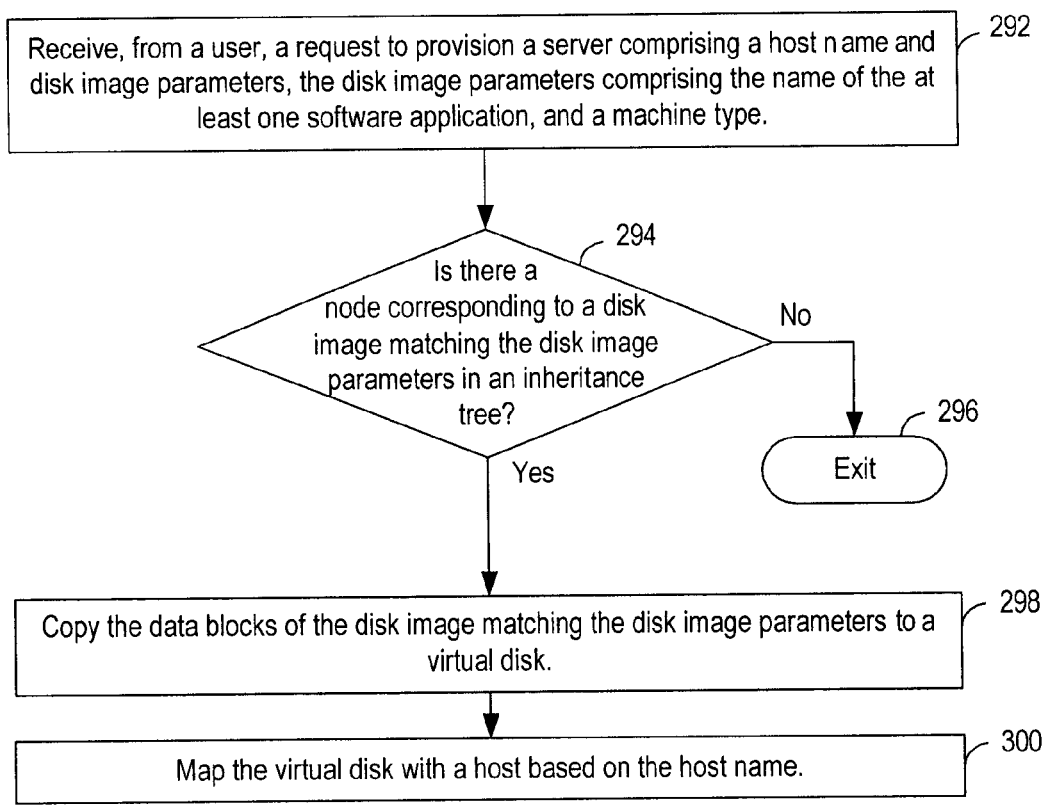
FIG. 9 depicts a flowchart of an embodiment of provisioning a server using a disk image inheritance tree.

FIG. 9 depicts a flowchart of an embodiment of provisioning a server. In step 292, the disk image management console receives, from a user, a request to provision a server comprising a host name with disk image parameters. The disk image parameters comprise the name of at least one software application and a machine type, and in some embodiments, a host name and the storage size. The host name designates the server, which in various embodiments is an application server.

In step 294, the disk image management console determines whether there is a node corresponding to a disk image matching the disk image parameters in an inheritance tree. The disk image management console invokes the tree topology module to make this determination. The tree topology module determines whether a node of an inheritance tree corresponds to a disk image for the specified machine type and comprising all the specified software application(s) as described above with respect to step 242 of FIG. 8A. In some embodiments, the tree topology module also determines whether the storage size of the disk image matches the storage size of the request. If there is no node corresponding to a disk image matching the disk image parameters in an inheritance tree, in step 296, the flowchart exits.

In response to the disk image management console determining, in step 294, that there is a node corresponding to a disk image matching the disk image parameters in the inheritance tree, in step 298, the data blocks of the disk image matching the disk image parameters are copied to a virtual disk. The disk image management console retrieves the disk image name and timestamp from the node corresponding to the matching disk image. The disk image management console issues a flash copy command with the retrieved disk image name and timestamp to copy the data blocks of that disk image from at least one storage device to a virtual disk.

In step 300, the disk image management console maps the virtual disk with a host based on the host name. After mapping the virtual disk with the host, the host can be booted using the software on the virtual disk.

In an alternate embodiment, step 298 is omitted, and the disk image in the storage device is mapped to the host to provision the server software.

Figure 10:
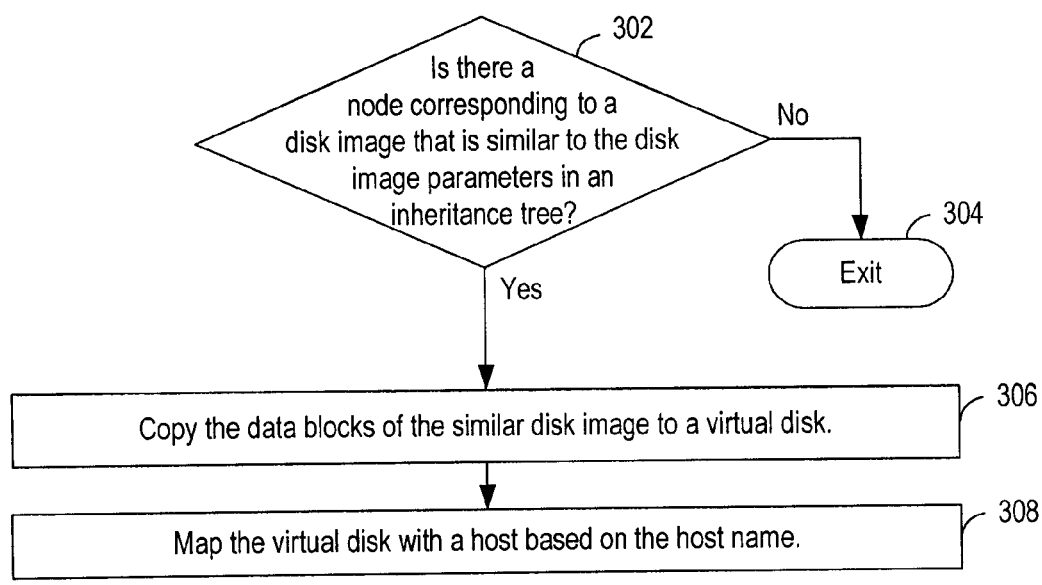
FIG. 10 depicts a flowchart of another embodiment of provisioning a server using a disk image inheritance tree.

FIG. 10 depicts a flowchart of another embodiment of provisioning server. In various embodiments, FIG. 10 replaces step 296 of FIG. 9.

In step 302, the tree topology module determines whether there is a node in an inheritance tree corresponding to a disk image that is similar to the specified disk image parameters. A node is determined to correspond to a disk image that is similar to the specified disk image parameters as described above with reference to step 258 of FIG. 8B. In response to determining that no node corresponds to a similar disk image, in step 304, the flowchart exits. In response to determining that a node corresponds to a similar disk image, in step 306, the data blocks of the similar disk image are copied to a virtual disk. The disk image management console retrieves the disk image name and timestamp of the similar disk image from the corresponding node in the inheritance tree and issues a flash copy command with that disk image name and timestamp. In step 308, the virtual disk is mapped with a host based on the host name.

In various embodiments, a flash copy is used to generate and copy disk images. In other embodiments, a copy operation other than the point-in-time flash copy is used to generate a full disk image and to copy a disk image. In various embodiments, an incremental flash copy is used to generate a disk image which shares at least one data block with another disk image. In other embodiments, an incremental copy operation other than the point-in-time incremental flash copy is used to generate a disk image which shares at least one data block.

Various embodiments of the invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, various embodiments of the invention can take the form of a computer program product accessible from a computer usable or computer-readable medium providing program code for use by or in connection with a computer or any instruction execution system. For the purposes of this description, a computer usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and digital video disk (DVD).

Figure 11:
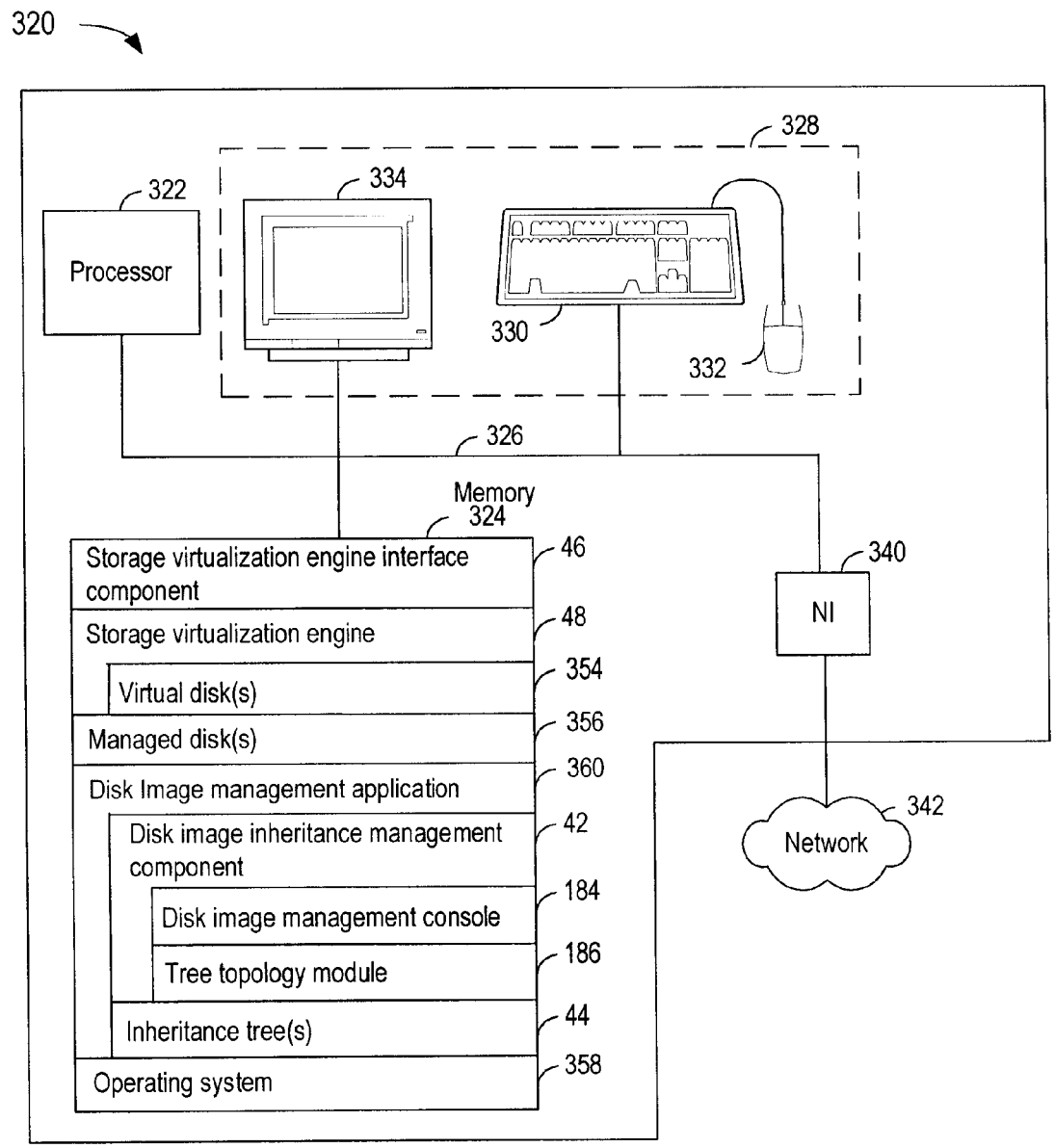
FIG. 11 depicts an illustrative storage system which uses various embodiments of the present invention.

FIG. 11 depicts an illustrative storage system 320 which uses various embodiments of the present invention. The storage system 320 suitable for storing and/or executing program code will include at least one processor 322 coupled directly or indirectly to memory elements 324 through a system bus 326. The memory elements 324 can include local memory employed during actual execution of the program code, bulk storage, and cache memories which provide temporary storage of at least some program code in order to reduce the number of times code must be retrieved from bulk storage during execution.

Input/output or I/O devices 328 (including but not limited to, for example, a keyboard 330, pointing device such as a mouse 332, a display 334, etc.) can be coupled to the system bus 326 either directly or through intervening I/O controllers. In other embodiments, I/O devices 328 are omitted.

Network adapters, such as a network interface (NI) 340, may also be coupled to the system bus 326 to enable the storage system to become coupled to servers or data processing systems or remote printers or other storage devices through intervening private or public networks 342. Modems, cable modem and Ethernet cards are just a few of the currently available types of network adapters. The network adapter may be coupled to the network via a network transmission line, for example twisted pair, coaxial cable or fiber optic cable, or a wireless interface that uses a wireless transmission medium. In addition, the software in which various embodiments are implemented may be accessible through the transmission medium, for example, from a server over the network.

The memory elements 324 store a storage virtualization engine interface component 46, a storage virtualization engine 48 providing virtual disk(s) 354, managed disk(s) 336 and a disk image management application 360. The virtual disks 354 are stored in the managed disk(s) 336. The disk image management application 360 comprises the disk image inheritance management component 42, tree topology module 186 and one or more inheritance trees 44. In various embodiments, the disk image inheritance management component 42 comprises the disk image management console 184 of FIG. 6 and tree topology module 186 of FIG. 6. In some embodiments, the memory elements 304 also comprise an operating system 358.

The operating system 358 may be implemented by any conventional operating system such as z/OS® (Registered Trademark of International Business Machines Corporation), MVS® (Registered Trademark of International Business Machines Corporation), OS/390® (Registered Trademark of International Business Machines Corporation), AIX® (Registered Trademark of International Business Machines Corporation), UNIX® (UNIX is a registered trademark of the Open Group in the United States and other countries), WINDOWS® (Registered Trademark of Microsoft Corporation), LINUX® (Registered trademark of Linus Torvalds), Solaris® (Registered trademark of Sun Microsystems Inc.) and HP-UX® (Registered trademark of Hewlett-Packard Development Company, L.P.).

The exemplary storage system 320 that is illustrated in FIG. 11 is not intended to limit the present invention. Other alternative hardware environments may be used without departing from the scope of the present invention.

Various embodiments of the present invention have the following advantages. In some embodiments, storage capacity is efficiently utilized. In various embodiments, the disk image inheritance technique greatly reduces storage consumption of persistent storage. Since there are typically many common data blocks among child and ancestor disk images, those data blocks will be shared. Hence, in various embodiments, a large number of application server disk images can be created and stored in the storage system. Therefore, using various embodiments, a user can construct a fast and on-demand application server provisioning service repository.

Another advantage of various embodiments is that the storage level management is independent from the host, in some embodiments an application server. Various embodiments of the present invention are implemented in the storage system, and therefore do not affect the upper layer operating system that is executed by the host. Thus, various embodiments reduce the complexity of disk image management and improve the management performance.

Yet another advantage of some embodiments is the ease of maintenance and use. Using some embodiments, from the application server provisioning service point of view, performing disk image management at the storage system is easy to maintain and use.

The foregoing detailed description of various embodiments of the invention has been presented for the purposes of illustration and description. It is not intended to be exhaustive or to limit the invention to the precise form disclosed. Many modifications and variations are possible in light of the above teachings. It is intended that the scope of the invention be limited not by this detailed description, but rather by the claims appended thereto.

What is claimed is:

1. A computer-implemented method comprising:
generating a first disk image, said first disk image being stored in at least one persistent storage device, said first disk image being a root disk image, wherein said first disk image comprises complete content of a disk; said first disk image comprising a first software application;
creating an inheritance tree comprising a first node, said first node being a root node corresponding to said root disk image;
generating a second disk image of said disk based on said first disk image, said second disk image being stored in said at least one persistent storage device, said second disk image comprising at least one data block of said first disk image and at least one new data block in said at least one persistent storage device; said second disk image comprising said first software application and a second software application; said first disk image not comprising said second software application; and
adding a second node to said inheritance tree, said second node corresponding to said second disk image, said second node being a child node of said root node; a hierarchy of said first node and said second node of said inheritance tree indicating an order of installation of said first software application and said second software application;
wherein each node of said inheritance tree comprises a disk image name, a timestamp, and an application stack name, said application stack name indicating a most recently added software application of a disk image corresponding to said each node.

2. The method of claim 1 wherein said disk is a virtual disk.

3. The method of claim 1 wherein said at least one persistent storage device comprises at least one managed disk.

4. The method of claim 1 wherein said generating said first disk image comprises performing a flash copy, and said generating said second disk image comprises performing an incremental flash copy.

5. The method of claim 1 further comprising:
graphically presenting said inheritance tree.

6. The method of claim 1 wherein said inheritance tree comprises a plurality of nodes corresponding to a plurality of disk images, respectively, further comprising:
selecting one node of said plurality of nodes of said inheritance tree; and
mapping a disk image of said plurality of disk images corresponding to said selected node to a host.

7. The method of claim 1 wherein said inheritance tree comprises a plurality of nodes corresponding to a plurality of disk images, respectively, further comprising:
selecting one node of said plurality of nodes of said inheritance tree;
copying a disk image of said plurality of disk images corresponding to said selected node from said at least one persistent storage device to said disk; and
installing said at least one new software application on said disk.

8. The method of claim 1 wherein said inheritance tree comprises a plurality of nodes corresponding to a plurality of disk images, respectively, further comprising:
receiving a request to provision server software, said request specifying at least one software application and a host;
identifying one node of said plurality of nodes of said inheritance tree based on said at least one software application of said request;
copying a disk image of said plurality of disk images corresponding to said identified node from said at least one persistent storage device to a virtual disk; and
mapping said virtual disk to said host.

9. The method of claim 1 wherein said inheritance tree comprises a plurality of nodes corresponding to a plurality of disk images, respectively, further comprising:
- receiving a request to provision server software, said request specifying at least one software application;
- identifying one node of said plurality of nodes of said inheritance tree based on said at least one software application of said request; and
- mapping said disk image corresponding to said identified node to a host.

10. The method of claim 1 wherein each disk image of said disk corresponding to each child node in said inheritance tree comprises at least one data block of a disk image of said disk corresponding to an ancestor node of said child node in said inheritance tree.

11. The method of claim 10 wherein said each disk image corresponding to said child node has at least one software application that said disk image corresponding to said ancestor node of said child node does not have.

12. The method of claim 1 wherein said generating said second disk image and said adding said second node are performed in response to a user request.

13. The method of claim 1 further comprising:
- generating a third disk image of said disk based on said second disk image, said third disk image being stored in said at least one persistent storage device; said third disk image comprising at least one data block of said first disk image, at least one data block of said second disk image and at least one another new data block in said at least one persistent storage device; said third disk image comprising said first software application, a second software application and a third software application; said first disk image not comprising said third software application; said second disk image not comprising said third software application; and
- adding a third node to said inheritance tree, said third node corresponding to said third disk image, said third node being a child node of said second node; a hierarchy of said first node, said second node and said third node of said inheritance tree indicating an order of installation of said first software application, said second software application and said third software application.

14. An article of manufacture for provisioning a server, said article of manufacture comprising a computer readable storage medium having computer readable program code embodied therewith, said computer readable program code comprising:
- computer readable program code configured to generate a first disk image, said first disk image being stored in at least one persistent storage device, said first disk image being a root disk image, wherein said first disk image comprises complete content of a disk; said first disk image comprising a first software application;
- computer readable program code configured to create an inheritance tree comprising a first node, said first node being a root node corresponding to said root disk image;
- computer readable program code configured to generate a second disk image of said disk based on said first disk image, said second disk image being stored in said at least one persistent storage device, said second disk image comprising at least one data block of said first disk image and at least one new data block in said at least one persistent storage device; said second disk image comprising said first software application and a second software application; said first disk image not comprising said second software application; and
- computer readable program code configured to add a second node to said inheritance tree, said second node corresponding to said second disk image, said second node being a child node of said root node; a hierarchy of said first node and said second node of said inheritance tree indicating an order of installation of said first software application and said second software application;
- wherein each node of said inheritance tree comprises a disk image name, a timestamp, and an application stack name, said application stack name indicating a most recently added software application of a disk image corresponding to said each node.

15. The article of manufacture of claim 14 wherein said computer readable program code configured to generate said first disk image invokes a flash copy, and said computer readable program code configured to generate said second disk image invokes an incremental flash copy.

16. The article of manufacture of claim 14 further comprising:
- computer readable program code configured to present said inheritance tree.

17. The article of manufacture of claim 14 further comprising:
- computer readable program code configured to receive a selection of a node of said inheritance tree; and
- computer readable program code configured to map said a disk image corresponding to said selected node to a host.

18. The article of manufacture of claim 14 wherein said inheritance tree comprises a plurality of nodes corresponding to a plurality of disk images, respectively, further comprising:
- computer readable program code configured to receive a request to provision server software, said request specifying at least one software application and a host;
- computer readable program code configured to identify one node of said plurality of nodes corresponding to a disk image comprising said at least one software application of said request;
- computer readable program code configured to copy said disk image corresponding to said identified node from said at least one persistent storage device to a virtual disk; and
- computer readable program code configured to map said virtual disk to said host.

19. The article of manufacture of claim 14 wherein said inheritance tree comprises a plurality of nodes corresponding to a plurality of disk images, respectively, further comprising:
- computer readable program code configured to receive a request to provision server software, said request specifying a plurality of software applications and a host;
- computer readable program code configured to identify one similar node of a plurality of nodes of said inheritance tree corresponding to a similar disk image of said plurality of disk images comprising less than all of said plurality of software applications of said request; and
- computer readable program code configured to copy said similar disk image from said at least one persistent storage device to a virtual disk.

20. The article of manufacture of claim 14 wherein said inheritance tree comprises a plurality of nodes corresponding to a plurality of disk images, respectively, further comprising:
- computer readable program code configured to receive a request to provision server software, said request specifying at least one software application and a host;
- computer readable program code configured to identify one node of said plurality of nodes of said inheritance tree based on said at least one software application of said request; and computer readable program code configured to map a disk image corresponding to said identified node to said host.

21. A storage system comprising:
at least one processor;
at least one persistent storage device; and
a memory storing instructions executable by said at least one processor, said instructions to:
  generate a first disk image, said first disk image being stored in said at least one persistent storage device, said first disk image being a root disk image, wherein said first disk image comprises complete content of a disk, said first disk image comprising a first software application;
  create an inheritance tree comprising a first node, said first node being a root node corresponding to said root disk image;
  generate a second disk image of said disk based on said first disk image, said second disk image being stored in said at least one persistent storage device, said second disk image comprising at least one data block of said first disk image and at least one new data block in said at least one persistent storage device; said second disk image comprising said first software application and a second software application; said first disk image not comprising said second software application; and
  add a second node to said inheritance tree, said second node corresponding to said second disk image, said second node being a child node of said root node; a hierarchy of said first node and said second node of said inheritance tree indicating an order of installation of said first software application and said second software application;
wherein each node of said inheritance tree comprises a disk image name, a timestamp, and an application stack name, said application stack name indicating a most recently added software application of a disk image corresponding to said each node.

22. The storage system of claim 21 wherein said instructions to generate said first disk image invoke a flash copy, and said instructions to generate said second disk image invoke an incremental flash copy.

23. The storage system of claim 21, wherein said memory further comprises instructions to:
  present said inheritance tree.

24. The storage system of claim 21 wherein said memory further comprises instructions to:
  receive a selection of a node of said inheritance tree; and
  map a disk image corresponding to said selected node to a server.

25. The storage system of claim 21 wherein said memory further comprises instructions to:
  select one node of a plurality of nodes of said inheritance tree;
  copy a disk image corresponding to said selected node from said at least one persistent storage device to said disk; and
  install at least one new software application on said disk.

26. The storage system of claim 21 wherein said memory further comprises instructions to:
  receive a request to provision server software, said request specifying at least one software application;
  identify one node of a plurality of nodes of said inheritance tree based on said at least one software application of said request;
  copy a disk image corresponding to said identified node from said at least one persistent storage device to a virtual disk; and
  map said virtual disk to a host.

27. The storage system of claim 21 wherein said memory further comprises instructions to:
  receive a request to provision a server, said request specifying at least one software application and a host;
  identify one node of a plurality of nodes said inheritance tree based on said at least one software application of said request; and
  map a disk image corresponding to said identified node to said host.

* * * * *